United States Patent
Kobayashi et al.

(10) Patent No.: US 6,556,713 B2
(45) Date of Patent: Apr. 29, 2003

(54) IMAGE PROCESSING APPARATUS AND METHOD AND STORAGE MEDIUM

(75) Inventors: Yuji Kobayashi, Kawasaki (JP); Kentaro Matsumoto, Kurume (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/126,390

(22) Filed: Jul. 30, 1998

(65) Prior Publication Data

US 2002/0071615 A1 Jun. 13, 2002

(30) Foreign Application Priority Data

Jul. 31, 1997 (JP) ............................................. 9-206094
Jul. 31, 1997 (JP) ............................................. 9-206095
Jul. 31, 1997 (JP) ............................................. 9-206097

(51) Int. Cl.[7] ........................... G06K 9/34; G06K 9/54; G06K 9/62; H04N 1/00; G06F 17/30
(52) U.S. Cl. ...................... 382/224; 382/173; 382/181; 382/305; 382/229; 358/403; 707/1; 707/3; 707/4
(58) Field of Search ................................ 382/181, 224, 382/305, 306, 151, 173, 189, 229, 291, 295; 358/403; 707/1, 3, 6, 2, 4, 5, 534

(56) References Cited

U.S. PATENT DOCUMENTS

| | | | | |
|---|---|---|---|---|
| 4,785,413 A | * | 11/1988 | Atsumi ........................ 707/534 |
| 4,799,191 A | * | 1/1989 | Yoshimura ................... 707/533 |
| 5,109,439 A | * | 4/1992 | Froessl ........................ 382/305 |
| 5,297,039 A | * | 3/1994 | Kanaegami et al. ........... 707/5 |
| 5,375,235 A | * | 12/1994 | Berry et al. .................... 707/5 |
| 5,572,726 A | * | 11/1996 | Hasuo ......................... 707/200 |
| 5,625,767 A | * | 4/1997 | Bartell et al. ................ 345/440 |
| 5,751,286 A | * | 5/1998 | Barber et al. ................ 345/348 |
| 5,757,224 A | * | 5/1998 | Rose et al. ..................... 707/5 |
| 5,771,378 A | * | 6/1998 | Holt et al. ...................... 707/5 |
| 5,832,450 A | * | 11/1998 | Myers et al. .................. 705/3 |
| 5,852,823 A | * | 12/1998 | De Bonet ....................... 707/6 |
| 5,945,982 A | * | 8/1999 | Higashio et al. ............. 345/203 |
| 5,960,407 A | * | 9/1999 | Vivona ......................... 705/10 |
| 5,978,768 A | * | 11/1999 | McGovern ..................... 705/1 |
| 6,006,224 A | * | 12/1999 | McComb et al. .............. 707/5 |
| 6,038,560 A | * | 3/2000 | Wical ............................. 707/5 |

* cited by examiner

Primary Examiner—Andrew W. Johns
Assistant Examiner—Daniel G. Mariam
(74) Attorney, Agent, or Firm—Fitzpatrick, Cella, Harper & Scinto

(57) ABSTRACT

A search result of a search target object is displayed at a high speed. By dividing an image into a plurality of areas and allocating attribute information to each area, only the area including the attribute information showing the search target object is searched and is displayed or transmitted, so that a part of a desired image can be extracted at a high speed.

27 Claims, 24 Drawing Sheets

FIG. 3

| TILE NO. | KEY WORD |
| --- | --- |
| 0 | SKY |
| 1 | SKY |
| 2 | SKY |
| 3 | SKY, SUN |
| 4 | SKY, SUN |
| 5 | SKY |
| 6 | SKY, MALE |
| 7 | SKY, FEMALE |
| 8 | SKY, SUN |
| 9 | SKY, SUN |
| 10 | SKY |
| 11 | SKY, MALE |
| 12 | SKY, FEMALE |
| 13 | SKY, YACHT |
| 14 | SKY, YACHT |
| 15 | SEA |
| 16 | SKY, MALE |
| 17 | SKY, FEMALE |
| 18 | SKY, YACHT |
| 19 | SKY, YACHT |

KEY WORD: SKY, SEA, SUN, YACHT, MALE, FEMALE

FIG. 9

| IMAGE ID 91 | IMAGE FILE PATH 92 |
|:---:|:---:|
|  |  |
| 1024 | X : ¥SCENE¥123. FPX |
|  |  |
| 1563 | X : ¥FRUIT¥078. FPX |
| 1564 | X : ¥FRUIT¥079. FPX |
| 1565 | X : ¥FRUIT¥080. FPX |
|  |  |

FIG. 10

| IMAGE ID | TILE NO. | KEY WORD | IMAGE CHARACTER-ISTIC |
|---|---|---|---|
| 1024 | 0 | SKY | 11 |
| 1024 | 1 | SKY | 11 |
| 1024 | 2 | SKY | 11 |
| 1024 | 3 | SKY, SUN | 13 |
| 1024 | 4 | SKY, SUN | 13 |
| 1024 | 5 | SKY | 11 |
| 1024 | 6 | SKY, MALE | 16 |
| 1024 | 7 | SKY, FEMALE | 16 |
| 1024 | 8 | SKY, SUN | 13 |
| 1024 | 9 | SKY, SUN | 13 |
| 1024 | 10 | SKY | 11 |
| 1024 | 11 | SKY, MALE | 16 |
| 1024 | 12 | SKY, FEMALE | 16 |
| 1024 | 13 | SKY, YACHT | 20 |
| 1024 | 14 | SKY, YACHT | 20 |
| 1024 | 15 | SEA | 17 |
| 1024 | 16 | SEA, MALE | 16 |
| 1024 | 17 | SEA, FEMALE | 16 |
| 1024 | 18 | SEA, YACHT | 8 |
| 1024 | 19 | SEA, YACHT | 8 |
| 1563 | 0 | BACKGROUND | 26 |
| 1563 | 1 | BACKGROUND | 26 |
| 1563 | 2 | BACKGROUND | 26 |
| 1563 | 3 | BACKGROUND | 26 |
| 1563 | 4 | BACKGROUND | 26 |
| 1563 | 5 | BACKGROUND | 26 |
| 1563 | 6 | BACKGROUND | 26 |
| 1563 | 7 | APPLE | 3 |
| 1563 | 8 | BACKGROUND | 26 |
| 1563 | 9 | BACKGROUND | 26 |
| 1563 | 10 | BACKGROUND | 26 |
| 1563 | 11 | BACKGROUND | 26 |
| 1563 | 12 | APPLE | 3 |
| 1563 | 13 | BANANA | 9 |
| 1563 | 14 | BANANA | 9 |
| 1563 | 15 | BACKGROUND | 26 |
| 1563 | 16 | BACKGROUND | 26 |
| 1563 | 17 | BANANA | 9 |
| 1563 | 18 | BANANA | 9 |
| 1563 | 19 | BANANA | 9 |
| 1564 | 0 | BACKGROUND | 26 |
| 1564 | 1 | BACKGROUND | 26 |
| 1564 | 2 | BACKGROUND | 26 |
| 1564 | 3 | BACKGROUND | 26 |
| 1564 | 4 | BACKGROUND | 26 |
| 1564 | 5 | BACKGROUND | 26 |
| 1564 | 6 | BACKGROUND | 26 |
| 1564 | 7 | BACKGROUND | 26 |
| 1564 | 8 | BACKGROUND | 26 |
| 1564 | 9 | BACKGROUND | 26 |
| 1564 | 10 | BACKGROUND | 26 |
| 1564 | 11 | BACKGROUND | 26 |
| 1564 | 12 | BACKGROUND | 26 |
| 1564 | 13 | APPLE | 15 |
| 1564 | 14 | APPLE | 15 |
| 1564 | 15 | BACKGROUND | 26 |
| 1564 | 16 | BACKGROUND | 26 |
| 1564 | 17 | BACKGROUND | 26 |
| 1564 | 18 | APPLE | 15 |
| 1564 | 19 | APPLE | 15 |
| 1565 | 0 | BACKGROUND | 26 |
| 1565 | 1 | BACKGROUND | 26 |
| 1565 | 2 | BACKGROUND | 26 |
| 1565 | 3 | BACKGROUND | 26 |
| 1565 | 4 | BACKGROUND | 26 |
| 1565 | 5 | BACKGROUND | 26 |
| 1565 | 6 | APPLE | 15 |
| 1565 | 7 | APPLE | 15 |
| 1565 | 8 | BACKGROUND | 26 |
| 1565 | 9 | BACKGROUND | 26 |
| 1565 | 10 | BACKGROUND | 26 |
| 1565 | 11 | APPLE | 15 |
| 1565 | 12 | APPLE | 15 |
| 1565 | 13 | BACKGROUND | 26 |
| 1565 | 14 | BACKGROUND | 26 |
| 1565 | 15 | BACKGROUND | 26 |
| 1565 | 16 | BACKGROUND | 26 |
| 1565 | 17 | BACKGROUND | 26 |
| 1565 | 18 | BACKGROUND | 26 |
| 1565 | 19 | BACKGROUND | 26 |

FIG. 11

| KEY WORD | IMAGE ID | TILE NO. |
|---|---|---|
|  |  |  |
| SKY | 1024 | 0, 1, 2, 3, 4, 5, 6, 7, 8, 9, 10, 11, 12, 13, 14 |
| SEA | 1024 | 15, 16, 17, 18, 19 |
| SUN | 1024 | 3, 4, 8, 9 |
| MALE | 1024 | 6, 11, 16 |
| FEMALE | 1024 | 7, 12, 17 |
| YACHT | 1024 | 13, 14, 18, 19 |
| APPLE | 1563 | 7, 12 |
| APPLE | 1564 | 13, 14, 18, 19 |
| APPLE | 1565 | 6, 7, 11, 12 |
| BANANA | 1563 | 13, 14, 18, 19 |
|  |  |  |

FIG. 12

| POSITION DESIGNATE WORD | TILE NO. |
|---|---|
| TOP | 0, 1, 2, 3, 4 |
| UPPER LEFT | 0, 1, 5, 6 |
| UPPER RIGHT | 3, 4, 8, 9 |
| MIDDLE | 5, 6, 7, 8, 9, 10, 11, 12, 13, 14 |
| CENTER | 6, 7, 8, 11, 12, 13 |
| LEFT MIDDLE | 5, 6, 10, 11 |
| RIGHT MIDDLE | 8, 9, 13, 14 |
| BOTTOM | 15, 16, 17, 18, 19 |
| LOWER LEFT | 10, 11, 15, 16 |
| LOWER RIGHT | 13, 14, 18, 19 |

FIG. 13

| COLORING | IMAGE CHARACTERISTIC |
|---|---|
| BLACK | 0 |
|  |  |
| BLUE | 9, 10 |
| RED | 2, 3, 4 |
| YELLOW | 8, 9 |
| GREEN | 15, 17 |
|  |  |
| WHITE | 26 |

FIG. 14

| IMAGE ID | KEY WORD |
|---|---|
|  |  |
| 1024 | SKY, SEA, SUN, YACHT, MALE, FEMALE |
|  |  |
| 1563 | APPLE, BANANA |
| 1564 | APPLE |
| 1565 | APPLE |
|  |  |

FIG. 19

| PROPERTY NAME | ID CODE | TYPE |
|---|---|---|
| NUMBER OF RESOLUTIONS | 0×01000000 | VT_U14 |
| HIGHEST RESOLUTION WIDTH | 0×01000002 | VT_U14 |
| HIGHEST RESOLUTION HEIGHT | 0×01000003 | VT_U14 |
| DEFAULT DISPLAY HEIGHT | 0×01000004 | VT_R4 |
| DEFAULT DISPLAY WIDTH | 0×01000005 | VT_R4 |
| DISPLAY HEIGHT/ WIDTH UNITS | 0×01000006 | VT_U14 |

| PROPERTY NAME | ID CODE | TYPE |
|---|---|---|
| SUBIMAGE WIDTH | 0×02ii0000 | VT_U14 |
| SUBIMAGE HEIGHT | 0×02ii0001 | VT_U14 |
| SUBIMAGE COLOR | 0×02ii0002 | VT_BLOB |
| SUBIMAGE NUMERICAL FORMAT | 0×02ii0003 | VT_U14 \| VT_VECTOR |
| DECIMATION METHOD | 0×02ii0004 | VT_14 |
| DECIMATION PREFILTER WIDTH | 0×02ii0005 | VT_R4 |
| SUBIMAGE ICC PROFILE | 0×02ii0006 | VT_U12 \| VT_VECTOR |

| PROPERTY NAME | ID CODE | TYPE |
|---|---|---|
| JPEG TABLES | 0×03ii0001 | VT_BLOB |
| MAXIMUM JPEG TABLE INDEX | 0×03000002 | VT_U14 |

FIG. 20

| FIELD NAME | LENGTH | BYTE (s) |
|---|---|---|
| LENGTH OF HEADER STREAM HEADER | 4 | 0—3 |
| IMAGE WIDTH | 4 | 4—7 |
| IMAGE HEIGHT | 4 | 8—11 |
| NUMBER OF TILES | 4 | 12—15 |
| TILE WIDTH | 4 | 16—19 |
| TILE HEIGHT | 4 | 20—23 |
| NUMBER OF CHANNELS | 4 | 24—27 |
| OFFSET TO TILE HEADER TABLE | 4 | 28—31 |
| LENGTH OF TILE HEADER ENTRY | 4 | 32—35 |
| THE HEADER TABLE | VARIABLE | VARIABLE |

FIG. 21

| | | |
|---|---|---|
| 211 | IMAGE HEADER SECTION | IMAGE FORMAT IDENTIFIER |
| | | FILE SIZE |
| | | NUMBER OF PIXELS IN X DIRECTION (WIDTH) |
| | | NUMBER OF PIXELS IN X DIRECTION (HEIGHT) |
| | | SIZE IN DEPTH DIRECTION |
| | | PRESENCE/ABSENCE OF COMPRESSION |
| | | RESOLUTION |
| | | OFFSET TO BITMAP |
| | | COLOR PALETTE SIZE |
| | | COLOR PALETTE DATA |
| 212 | IMAGE DATA SECTION | BITMAP |

FIG. 27

| LAYER NO. | TILE NO. | KEY WORD | IMAGE CHARACTERISTIC |
|---|---|---|---|
| 0 | 0 | SKY, SUN, SEA, MALE, FEMALE, YACHT | 14 |
| 1 | 0 | SKY, SUN, SEA, MALE, FEMALE, YACHT | 14 |
|   | 1 | SKY, SUN, SEA, YACHT | 17 |
| 2 | 0 | SKY, MALE | 16 |
|   | 1 | SKY, FEMALE, SUN | 15 |
|   | 2 | SKY, SUN | 13 |
|   | 3 | SKY, SEA, MALE | 16 |
|   | 4 | SKY, SEA, FEMALE, YACHT | 17 |
|   | 5 | SKY, SEA, YACHT | 17 |
| 3 | 0 | SKY | 11 |
|   | 1 | SKY | 11 |
|   | 2 | SKY | 11 |
|   | 3 | SKY, SUN | 13 |
|   | 4 | SKY, SUN | 13 |
|   | 5 | SKY | 11 |
|   | 6 | SKY, MALE | 16 |
|   | 7 | SKY, FEMALE | 16 |
|   | 8 | SKY, SUN | 13 |
|   | 9 | SKY, SUN | 13 |
|   | 10 | SKY | 11 |
|   | 11 | SKY, MALE | 16 |
|   | 12 | SKY, FEMALE | 16 |
|   | 13 | SKY, YACHT | 20 |
|   | 14 | SKY, YACHT | 20 |
|   | 15 | SEA | 17 |
|   | 16 | SKY, MALE | 16 |
|   | 17 | SKY, FEMALE | 16 |
|   | 18 | SKY, YACHT | 8 |
|   | 19 | SKY, YACHT | 8 |

FIG. 28

| KEY WORD | IMAGE ID | TILE NO. | LAYER NO. |
|---|---|---|---|
| SKY | 1024 | 0, 1, 2, 3, 4, 5, 6, 7, 8, 9, 10, 11, 12, 13, 14 | 3 |
| SEA | 1024 | 15, 16, 17, 18, 19 | 3 |
| SUN | 1024 | 3, 4, 8, 9 | 3 |
| MALE | 1024 | 6, 11, 16 | 3 |
| FEMALE | 1024 | 7, 12, 17 | 3 |
| YACHT | 1024 | 13, 14, 18, 19 | 3 |
| APPLE | 1563 | 7, 12 | 3 |
| APPLE | 1564 | 13, 14, 18, 19 | 3 |
| APPLE | 1565 | 6, 7, 11, 12 | 3 |
| BANANA | 1563 | 13, 14, 18, 19 | 3 |

FIG. 29

| IMAGE ID | TILE NO. | KEY WORD | IMAGE CHARACTER-ISTIC | LAYER NO. | IMAGE ID | TILE NO. | KEY WORD | IMAGE CHARACTER-ISTIC | LAYER NO. |
|---|---|---|---|---|---|---|---|---|---|
| | | | | 3 | 1564 | 0 | BACKGROUND | 26 | 3 |
| 1024 | 0 | SKY | 11 | 3 | 1564 | 1 | BACKGROUND | 26 | 3 |
| 1024 | 1 | SKY | 11 | 3 | 1564 | 2 | BACKGROUND | 26 | 3 |
| 1024 | 2 | SKY | 11 | 3 | 1564 | 3 | BACKGROUND | 26 | 3 |
| 1024 | 3 | SKY, SUN | 13 | 3 | 1564 | 4 | BACKGROUND | 26 | 3 |
| 1024 | 4 | SKY, SUN | 13 | 3 | 1564 | 5 | BACKGROUND | 26 | 3 |
| 1024 | 5 | SKY | 11 | 3 | 1564 | 6 | BACKGROUND | 26 | 3 |
| 1024 | 6 | SKY, MALE | 16 | 3 | 1564 | 7 | BACKGROUND | 26 | 3 |
| 1024 | 7 | SKY, FEMALE | 16 | 3 | 1564 | 8 | BACKGROUND | 26 | 3 |
| 1024 | 8 | SKY, SUN | 13 | 3 | 1564 | 9 | BACKGROUND | 26 | 3 |
| 1024 | 9 | SKY, SUN | 13 | 3 | 1564 | 10 | BACKGROUND | 26 | 3 |
| 1024 | 10 | SKY | 11 | 3 | 1564 | 11 | BACKGROUND | 26 | 3 |
| 1024 | 11 | SKY, MALE | 16 | 3 | 1564 | 12 | BACKGROUND | 26 | 3 |
| 1024 | 12 | SKY, FEMALE | 16 | 3 | 1564 | 13 | APPLE | 15 | 3 |
| 1024 | 13 | SKY, YACHT | 20 | 3 | 1564 | 14 | APPLE | 15 | 3 |
| 1024 | 14 | SKY, YACHT | 20 | 3 | 1564 | 15 | BACKGROUND | 26 | 3 |
| 1024 | 15 | SEA | 17 | 3 | 1564 | 16 | BACKGROUND | 26 | 3 |
| 1024 | 16 | SEA, MALE | 16 | 3 | 1564 | 17 | BACKGROUND | 26 | 3 |
| 1024 | 17 | SEA, FEMALE | 16 | 3 | 1564 | 18 | APPLE | 15 | 3 |
| 1024 | 18 | SEA, YACHT | 8 | 3 | 1564 | 19 | APPLE | 15 | 3 |
| 1024 | 19 | SEA, YACHT | 8 | 3 | | | | | |
| | | | | | 1565 | 0 | BACKGROUND | 26 | 3 |
| 1563 | 0 | BACKGROUND | 26 | 3 | 1565 | 1 | BACKGROUND | 26 | 3 |
| 1563 | 1 | BACKGROUND | 26 | 3 | 1565 | 2 | BACKGROUND | 26 | 3 |
| 1563 | 2 | BACKGROUND | 26 | 3 | 1565 | 3 | BACKGROUND | 26 | 3 |
| 1563 | 3 | BACKGROUND | 26 | 3 | 1565 | 4 | BACKGROUND | 26 | 3 |
| 1563 | 4 | BACKGROUND | 26 | 3 | 1565 | 5 | BACKGROUND | 26 | 3 |
| 1563 | 5 | BACKGROUND | 26 | 3 | 1565 | 6 | APPLE | 15 | 3 |
| 1563 | 6 | BACKGROUND | 26 | 3 | 1565 | 7 | APPLE | 15 | 3 |
| 1563 | 7 | APPLE | 3 | 3 | 1565 | 8 | BACKGROUND | 26 | 3 |
| 1563 | 8 | BACKGROUND | 26 | 3 | 1565 | 9 | BACKGROUND | 26 | 3 |
| 1563 | 9 | BACKGROUND | 26 | 3 | 1565 | 10 | BACKGROUND | 26 | 3 |
| 1563 | 10 | BACKGROUND | 26 | 3 | 1565 | 11 | APPLE | 15 | 3 |
| 1563 | 11 | BACKGROUND | 26 | 3 | 1565 | 12 | APPLE | 15 | 3 |
| 1563 | 12 | APPLE | 3 | 3 | 1565 | 13 | BACKGROUND | 26 | 3 |
| 1563 | 13 | BANANA | 9 | 3 | 1565 | 14 | BACKGROUND | 26 | 3 |
| 1563 | 14 | BANANA | 9 | 3 | 1565 | 15 | BACKGROUND | 26 | 3 |
| 1563 | 15 | BACKGROUND | 26 | 3 | 1565 | 16 | BACKGROUND | 26 | 3 |
| 1563 | 16 | BACKGROUND | 26 | 3 | 1565 | 17 | BACKGROUND | 26 | 3 |
| 1563 | 17 | BANANA | 9 | 3 | 1565 | 18 | BACKGROUND | 26 | 3 |
| 1563 | 18 | BANANA | 9 | 3 | 1565 | 19 | BACKGROUND | 26 | 3 |
| 1563 | 19 | BANANA | 9 | 3 | | | | | |

IMAGE PROCESSING APPARATUS AND METHOD AND STORAGE MEDIUM

BACKGROUND OF THE INVENTION

1. Field of the Invention

The invention relates to image processing apparatus and method which can search accumulated images.

2. Related Background Art

FIG. 21 shows an example of an image format which has conventionally been used.

As shown in FIG. 21, an image file is divided into an image header section 211 and an image data section 212. Generally, information which is necessary when data is read out from the image file and additional information to explain the contents of an image are stored in the image header section 211. In the example of FIG. 21, information such as image format identifier showing an image format name, file size, width, height, and depth of the image, presence/absence of compression, information of a color palette, resolution, offset of the image data to a storing position, and the like is stored.

The image data section 212 is a portion where image data has sequentially been stored. As a typical example of such an image format, a BMP format of Microsoft Co., Ltd., a GIF format of Compuserve Co., Ltd., or the like is widely spread.

In case of preserving the image files into a database and searching and using it, hitherto, a key word and an explanation sentence of a language base have been made correspond to one image. That is, in an example of FIG. 5, key words of "Sky, Sea, Sun, Yacht, Male, Female" are allocated to one image. A data table showing a correspondence between the image and the key words are shown in FIG. 14. For example, when the user inputs the word "yacht" as a search word, this image is obtained as a result in which the key word coincides.

In the conventional example, even if a plurality of persons, objects, and regions of different characteristics exist in an image, only a process such that all of the allocated key words are handled as attribute information for one image can be performed. Therefore, it is used as a search result irrespective of the position in the image where the contents corresponding to the key word exist.

Consequently, for example, when "apple existing at the center" is given as a search word, among the key words corresponding to the image, all of the key words including "apple" are derived as a search result and an image in which "apple" is shown at the corner of the screen is also searched. Thus, it is impossible to perform the search according to the contents of the given search word.

When the image extracted as a result of the key word search is displayed, it is necessary to display the whole image irrespective of the position in the image where the contents corresponding to the key word exist. It takes very long time to display the image in dependence on an image size.

For one kind of image, attribute information can be handled only for one image. Even when displaying an image of low resolution, the result of the search on the basis of the attribute information of the original image is merely displayed at low resolution. There is a problem such that it takes time until a display from the search, a desired image is dropped out from the search, or the like.

In the conventional example, even in the case where one image has images of a plurality of resolutions, attribute information such as key word, image characteristic amount, or the like can be handled only as attribute information for one image.

SUMMARY OF THE INVENTION

According to an embodiment of the invention, there is provided an image processing apparatus for dividing image data into a plurality of areas and allocating attribute information to each of the divided areas.

BRIEF DESCRIPTION OF THE DRAWINGS

FIG. 3 is a diagram showing a correspondence table between tile numbers and key words included in the tiles;

FIG. 9 is a diagram showing a structure of a table in which image IDs and image file storing paths are made correspond to each other;

FIG. 10 is a diagram showing a structure of a table in which image IDs, key words of tiles, and image characteristic amounts are made correspond to each other;

FIG. 11 is a diagram showing a structure of a table in which key words, image IDs, and tile numbers are made correspond to each other;

FIG. 12 is a diagram showing a structure of a table in which position designate words in an image and tile numbers are made correspond to each other;

FIG. 13 is a diagram showing a structure of a table in which image characteristic words and image characteristics are made correspond to each other;

FIG. 14 is a diagram showing a structure of a correspondence table of image IDs and key words in a conventional example;

FIG. 19 is a diagram showing attribute information which is used in the FlashPix;

FIG. 20 is a diagram showing a structure of each layer data of the FlashPix;

FIG. 21 shows an example of a conventional image format;

FIG. 27 is a diagram showing a correspondence table of layer numbers, tile numbers, key words included in the tiles, and image characteristics;

FIG. 28 is a diagram showing a structure of a table in which key words, image IDs, and tile numbers are made correspond to each other; and FIG. 29 is a diagram showing a structure of a table in which image IDs, key words of tiles, image characteristic amounts and layer numbers are made correspond to each other.

DETAILED DESCRIPTION OF THE PREFERRED EMBODIMENT

The invention will now be described in detail hereinbelow with reference to the drawings.

Figure 1:
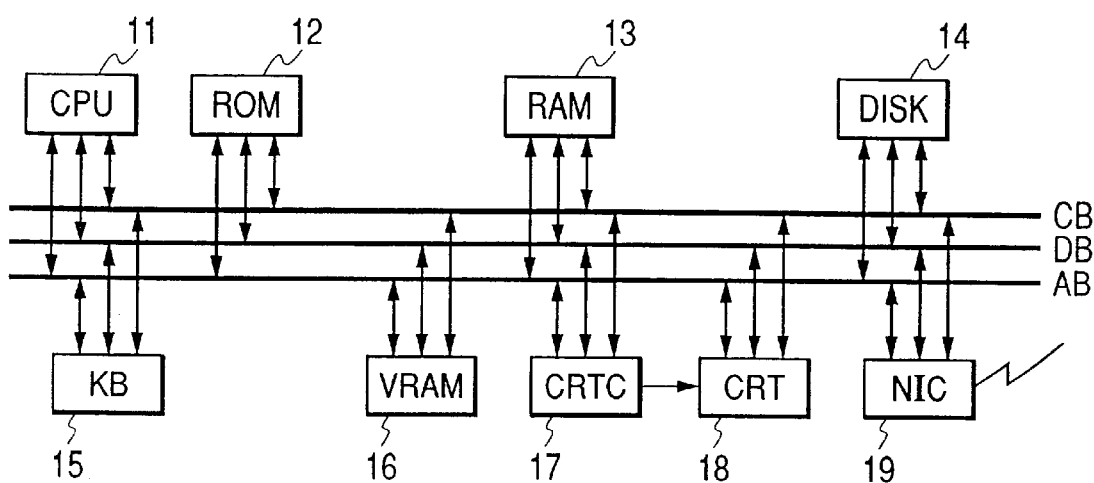
FIG. 1 is a block diagram showing a whole construction of the invention.

FIG. 1 shows an example of a whole construction of the invention.

In the construction shown in the diagram, reference numeral 11 denotes a microprocessor (CPU) for executing an arithmetic operation to search image information, a logical discrimination, and the like and controlling each of component elements connected to an address bus AB, a control bus CB, and a data bus DB through these buses.

The address bus AB transfers an address signal to instruct a component element as a target of control of the CPU 11. The control bus CB transfers a control signal of each component element as a control target of the CPU 11 and supplies. The data bus DB performs a data transfer among component equipment.

Reference numeral 12 denotes a fixed read only memory (ROM). An image searching program to realize the image processing apparatus of the invention has been stored in the ROM 12.

Reference numeral 13 denotes a writable random access memory (RAM) in which one word consists of 16 bits. The RAM 13 is used to temporarily store various data from the component elements. Although not shown, an input search word storing buffer WBUF, a search target tile number storing buffer TBUF, a search target image characteristic storing buffer FBUF, and a search result output buffer OBUF are temporarily stored in the RAM 13, respectively.

Reference numeral 14 denotes an external memory (DISK) such as a hard disk or the like. In the memory 14, there are stored: a reference table in which image IDs and image file storing paths, which will be explained hereinlater in FIG. 9, are made correspond to each other; a reference table in which image IDs, key words of tiles, and image characteristic amounts, which will be explained hereinlater in FIG. 10, are made correspond to each other; a reference table in which key words, image IDs, and tile numbers, which will be explained hereinlater in FIG. 11, are made correspond to each other; a reference table in which position designate words and tile numbers, which will be explained hereinlater in FIG. 12, are made correspond to each other; a reference table in which image characteristic words and image characteristics, which will be explained hereinlater in FIG. 13, are made correspond to each other; an image data file stored in a structure which will be explained hereinlater in FIG. 15; a program which is executed in accordance with a flowchart, which will be explained hereinlater in FIG. 22; and a word dictionary DIC (although not shown) in which information for a word division and a discrimination of a word classification which is referred in step S2202 in FIG. 22 has been stored. The image data file or the like is preserved as necessary. The preserved data is called as necessary by an instruction by a keyboard.

Reference numeral 15 denotes a keyboard (KB) having alphabet keys, Hiragana keys, Katakana keys, character symbol input keys such as a period and the like, and various function keys such as search key to instruct a search, cursor moving key to instruct the movement of a cursor, and the like.

Reference numeral 16 denotes a video memory for display (VRAM) in which patterns of data to be displayed have been stored.

Reference numeral 17 denotes a CRT controller (CRTC) for displaying the contents stored in the displaying video memory VRAM 16 onto a display device (CRT) 18.

Reference numeral 18 denotes the display device (CRT) using a cathode ray tube or the like. A display pattern constructed by dots and a display of a cursor on the display device CRT 18 are controlled by the CRT controller 17.

Reference numeral 19 denotes a network controller (NIC) for connecting to a network such as an Ethernet or the like.

The image processing apparatus of the invention comprising the above component elements operates in accordance with various inputs from the keyboard KB 15 and various inputs which are supplied from the network controller 19 via the network. When the input from the keyboard KB 15 and the input from the network controller 19 are supplied to the image processing apparatus, an interruption signal is first sent to the microprocessor CPU 11. The microprocessor CPU 11 reads out various control signals stored in the external memory DISK 14 and executes various controls in accordance with the control signals.

Figure 2:
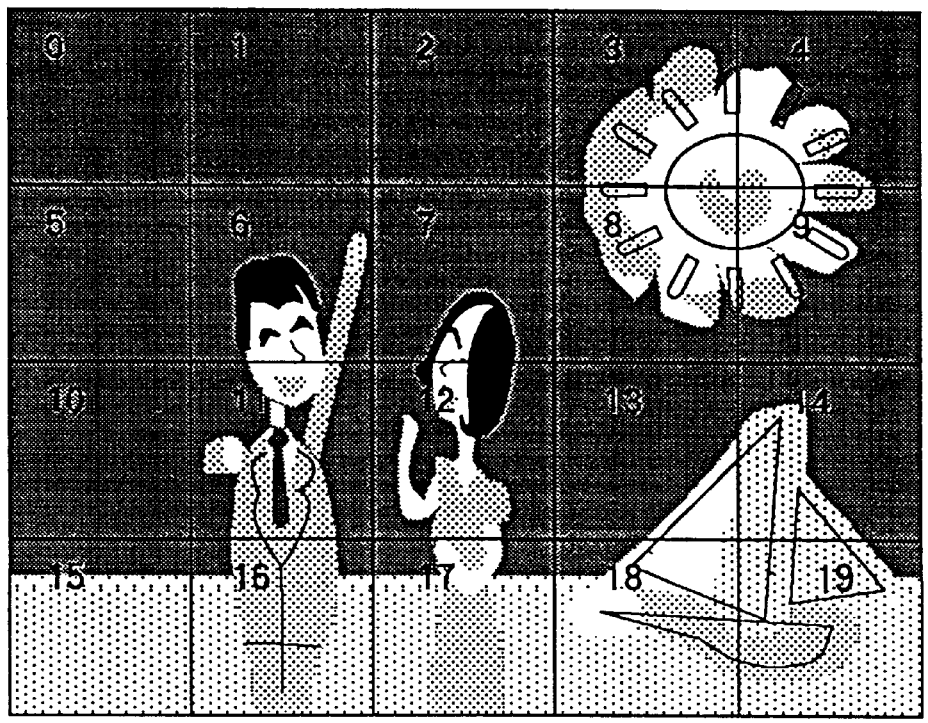
FIG. 2 is a diagram showing an example of an image divided like a tile which is used in the invention.
Figure 5:
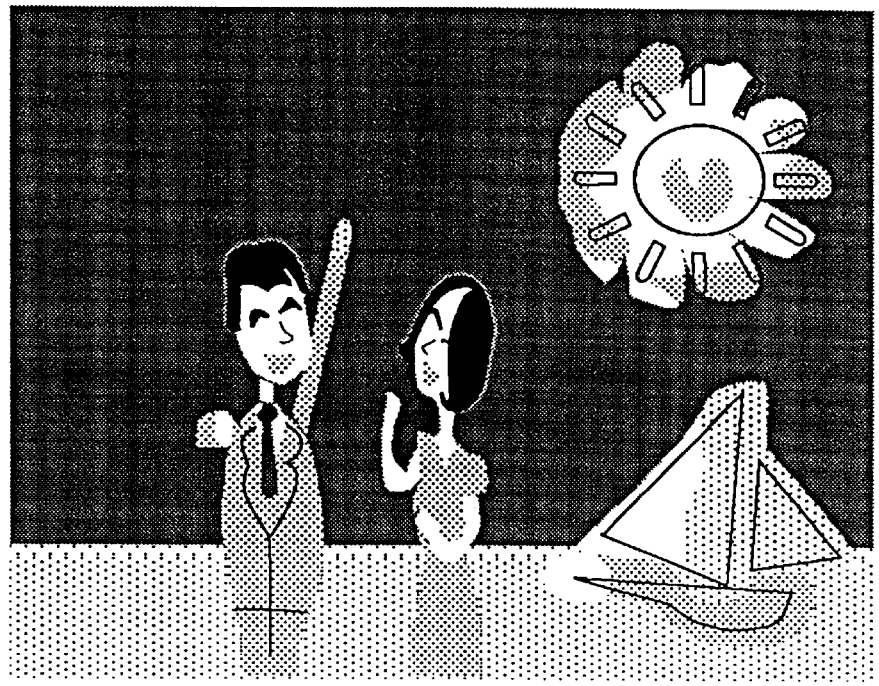
FIG. 5 is a diagram showing an image which is not divided into tiles and a key word.

FIG. 2 shows an example in which an image shown in FIG. 5 is divided into a plurality of tiles. In this example, the target image is divided into total 20 tiles comprising four tiles in the vertical direction and five tiles in the lateral direction. Numerals in the diagram show tile numbers which are sequentially numbered like 0, 1, 2, . . . from the upper left position of the image.

An example of an image format such that the image is divided into tiles as mentioned above is shown and will now be explained.

Description of a FlashPix™ File Format

Figure 15:
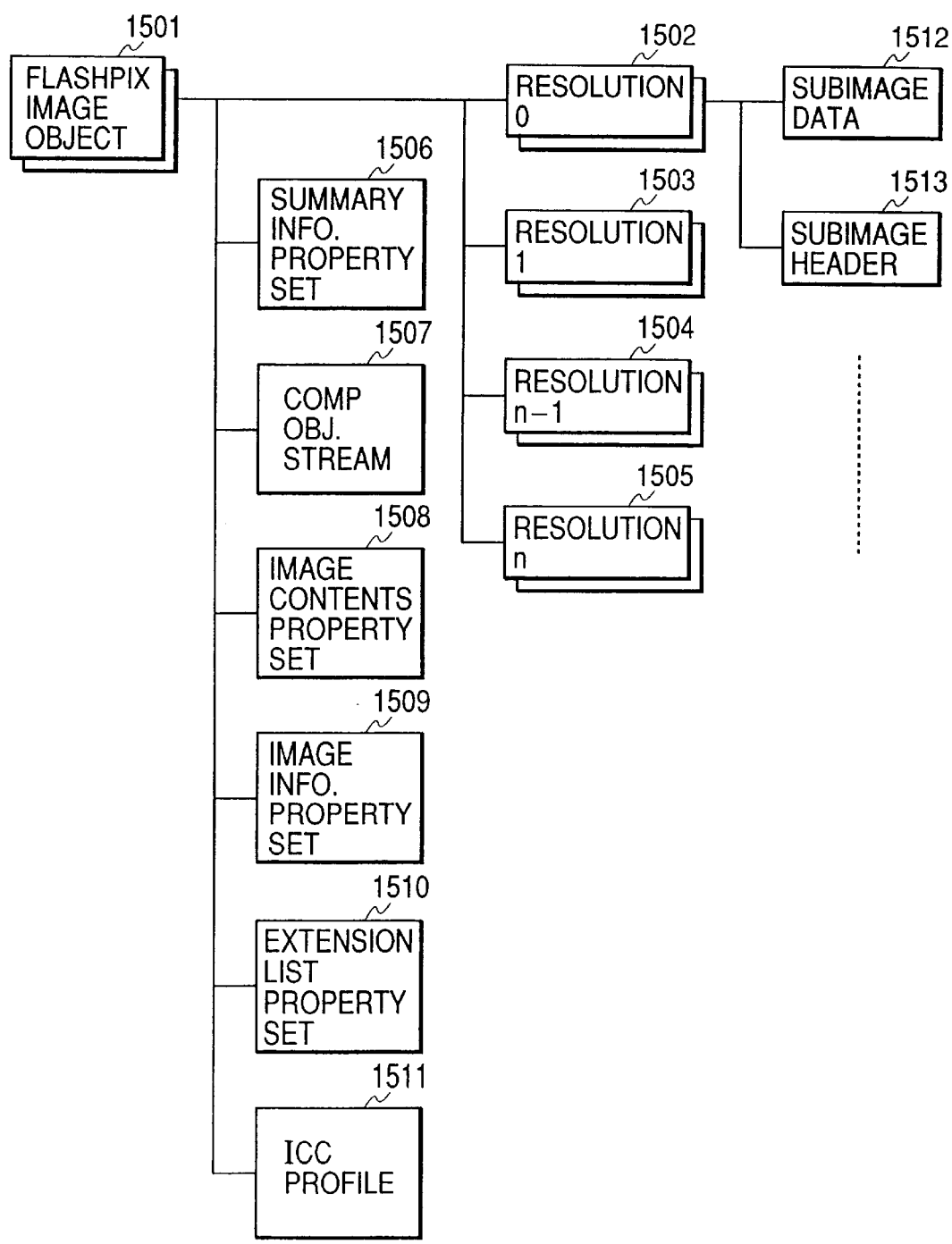
FIG. 15 is a diagram showing a structure of a FlashPix image object.
Figure 16:
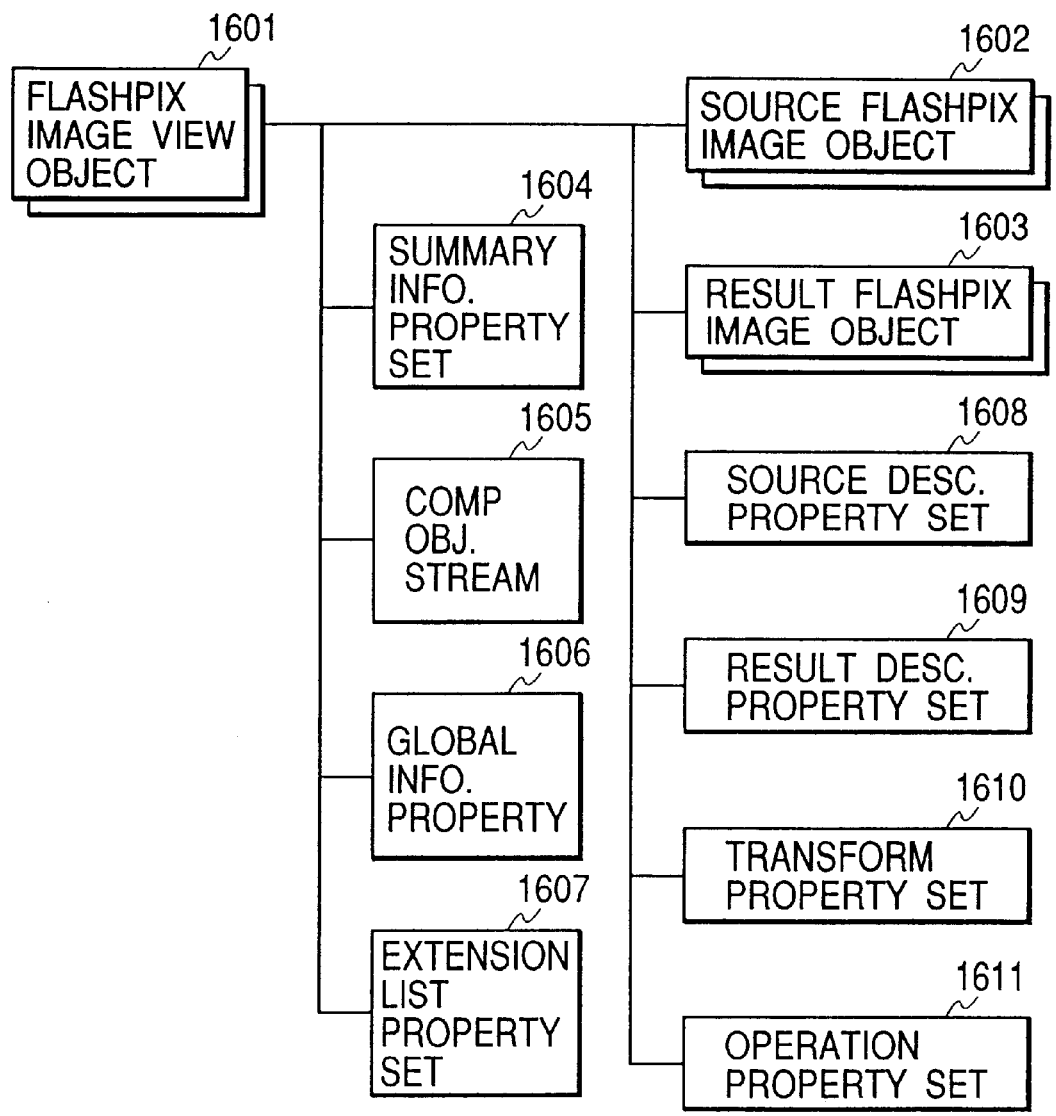
FIG. 16 is a diagram showing a structure of a FlashPix image view object.

According to the FlashPix™ (FlashPix is a registered trademark of Eastman Kodak Co., Ltd. in the U.S.A.) file format, which will be explained hereinlater, image attribute information and image data stored in the image header section are further structured and stored into files. The structured image files are shown in FIGS. 15 and 16.

Each property and data in the file are accessed by "storage" and "stream" corresponding to "directory" and "file" of MS-DOS. In FIGS. 15 and 16, portions with shadows (1501 to 1505, 1601 to 1603) correspond to storages and portions without a shadow (1506 to 1513, 1604 to 1611) correspond to streams. The image data and image attribute information are stored in the stream portion. The image data is layered by different resolutions and an image at each resolution is called a "Subimage" and those Subimages are shown by Resolutions 0, 1, . . . , and n, respectively. For each resolution image, information necessary to read out the image is stored into a Subimage Header 1513 and the image data is stored into a Subimage data 1512.

The Property set denotes that the attribute information is classified and defined in accordance with the use object and the contents. There are a "Summary info. Property set" 1506, an "Image info. Property set" 1509, an "Image contents Property set" 1508, and an "Extension list Property set" 1510.

Description of Each Property Set

The "Summary info. Property set" 1506 is not peculiar to the FlashPix but is a Property set which is indispensable for the structured storage of Microsoft Co., Ltd. and stores the title of the file, title, author, thumbnail image, and the like.

The "Image contents Property set" 1508 indicates attributes describing a storing method of the image data (FIG. 19). In the attributes, the number of layers of the image data, a width and a height of an image of the maximum resolution, a width and a height of an image of each resolution, a construction of the color, or a definition of a quantization table * a Huffman table when the JPEG compression is used is described.

The "Image info. Property set" 1509 stores various information which can be used when an image is used, for example, information showing how to fetch the image or how the image can be used.

information (File Source) regarding a fetching method or forming method of digital data information (Intellectual property) regarding a copyright information (Content description) regarding the contents (person in the image, location, and the like) of the image information (Camera information) regarding a camera used for photographing information (Per Picture camera settings) of the setting (exposure, shutter speed, focal distance, the presence or absence of the use of a flash, etc.) of the camera at the time of photographing information (Digital camera characterization) regarding the resolution or mosaic filter which is peculiar to a digital camera information (Film description) such as name of a manufacturer of a film, product name, kind (negative/positive, color/black and white), etc.

information (Original document scan description) regarding a kind and a size in the case where an original is a book or a printed matter in case of a scan image, information (Scan device) regarding software of a scanner used and a person who operated.

The "Extension list Property set" 1510 is an area which is used when adding information which is not included in the basic specification of the FlashPix.

A "FlashPix image view object" 1601 in FIG. 16 is an image file to store both of a viewing parameter and image data which are used when an image is displayed. The viewing parameter is a set of processing coefficients to store processes for the rotation, enlargement/reduction, movement, color conversion, and filtering of the image so as to be adapted when the image is displayed.

A "Source/Result FlashPix image object" (1602, 1603) is a substance of the FlashPix image data. The "Source Flash-Pix image object" 1602 is the inevitable image data. The "Result FlashPix image object" 1603 is the option. The "Source FlashPix image object" 1602 stores the original image data. The "Result FlashPix image object" 1603 stores the image as a result obtained by performing an image processing by using the viewing parameter.

A "Source/Result desc. Property set" (1608, 1609) is a Property set to identify the image data and stores an image ID, a Property set of the inhibition of the change, a final updating date and time, and the like.

A "Transform Property set" 1610 stores Affine transformation coefficients for rotation, enlargement/reduction, and movement, color conversion matrix, contrast adjustment value, and filtering coefficients.

A method of handling the image data will now be described.

Figure 17:
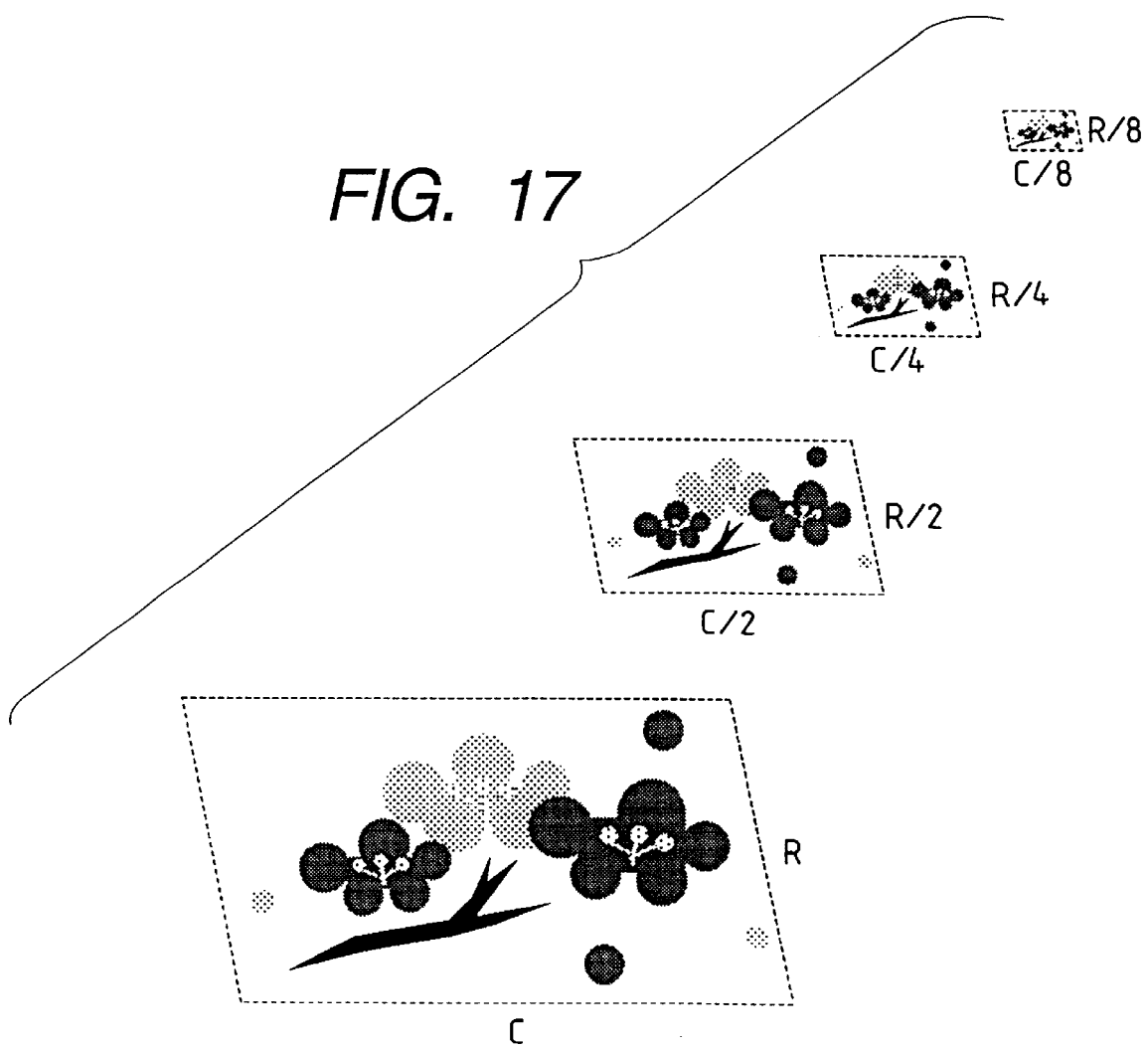
FIG. 17 is a diagram showing layer images of different resolutions.

Description of an Image Format Including Images of a Plurality of Resolutions Divided into Tiles FIG. 17 shows an example of an image file constructed by a plurality of images of different resolutions. In FIG. 17, an image of the maximum resolution is constructed by (columns×rows) of (X0×Y0). The next large image is constructed by (X0/2×Y0/2). After that, the image is sequentially reduced by ½ at a time with respect to both of the columns and the rows. The reducing process is repeated until the number of pixels in each of the column and the row is equal to or less than 64 pixels.

As a result of the execution of the layer processing as mentioned above, "the number of layers in one image file" is necessary as attribute information of the image and, for the image of each layer, the header information and the image data which were described in the item of the conventional image format are also necessary as attribute information. Information regarding the number of layers in one image file, a width and a height of the image of the maximum resolution, a width and a height of the image of each resolution, a color construction, a compressing method, or the like is described in the "Image contents Property set" in FIG. 19.

Figure 18:
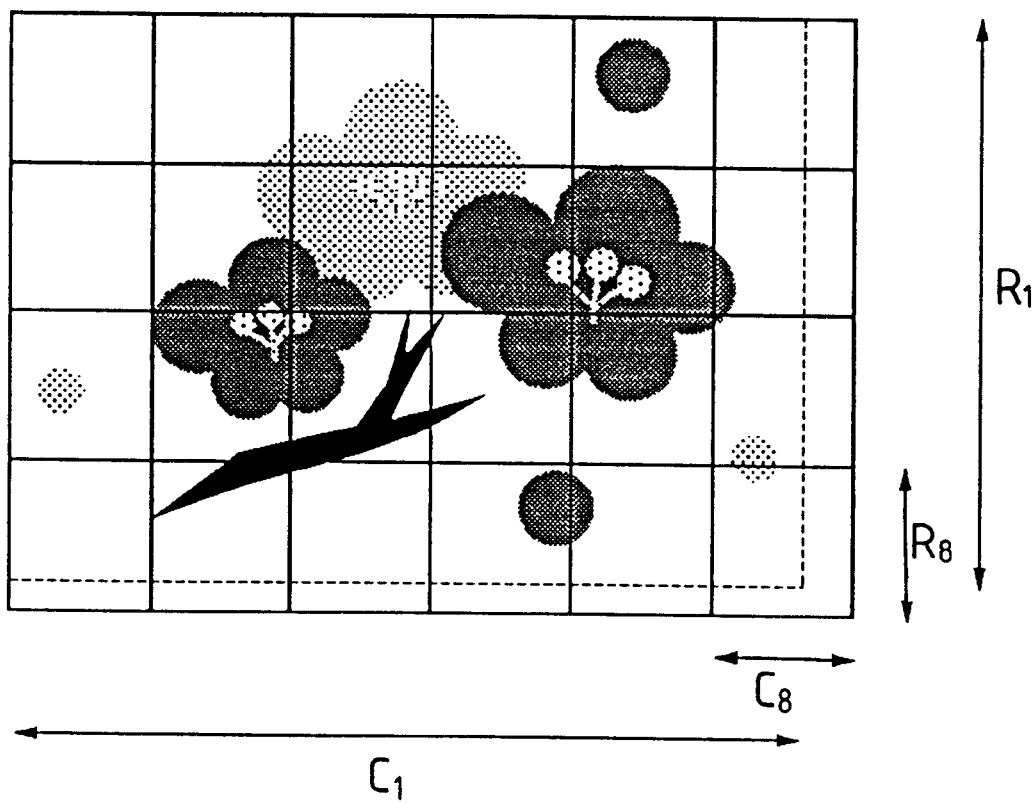
FIG. 18 is a diagram showing an image divided into tiles.

Further, the image of the layer of each resolution is divided into (64×64) tiles as shown in FIG. 18. Now, when the image is sequentially divided into (64×64) tiles from the upper left position of the image, there is a case where a blank occurs in parts of the tiles at the right edge and the lower edge in dependence on an image.

In this case, by repetitively inserting the rightmost image or the bottom image, respectively, (64×64) pixels are constructed. In the FlashPix™, the image in each tile is stored by a method of any one of the JPEG compression, single color, and non-compression. The JPEG compression is an image compressing method which was international standardized by ISO/IEC JTC1/SC29 and an explanation of this method itself is omitted here. The image data divided into the tiles as mentioned above is stored into the Subimage data stream 1512. All of the total number of tiles, a size of each tile, a start position of the data, and a compressing method have been stored in the Subimage Header (FIG. 20).

The "single color" is a method such that only in the case where one tile is constructed by the same color as a whole, the color of the tile is expressed by one (single) color without recording the values of the individual pixels. This method is particularly effective in an image formed by computer graphics.

When the image is divided into the tiles as mentioned above, the characteristic portion in the image which has hitherto been described by a key word is separated into each tile and is classified into the tiles including each key word and the tiles including no key word.

When the image of FIG. 2 is divided into tiles 0 to 19 and a key word included in each tile is described, they are as shown in FIG. 3. That is, "sky" is described in the tiles 0, 1, 2, 5, and 10. "sky" and "sun" are described in the tiles 3, 4, 8, and 9. "sky" and "male" are described in the tiles 6 and 11. "sky" and "female" are described in the tiles 7 and 12. "sky" and "yacht" are described in the tiles 13 and 14. "sea" is described in the tile 15. "sea" and "male" are described in the tile 16. "sea" and "female" are described in the tile 17. "sea" and "yacht" are described in the tiles 18 and 19.

Figure 4:
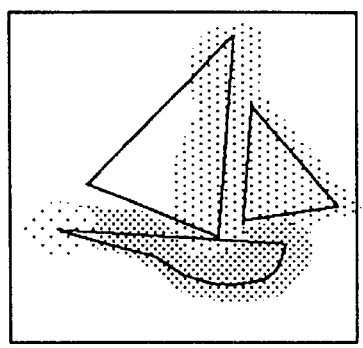
FIG. 4 is a diagram showing a part of the image divided into the tiles.

FIG. 4 shows a partial image constructed by the tiles 13, 14, 18, and 19 of the image shown in FIG. 2.

Figure 6:
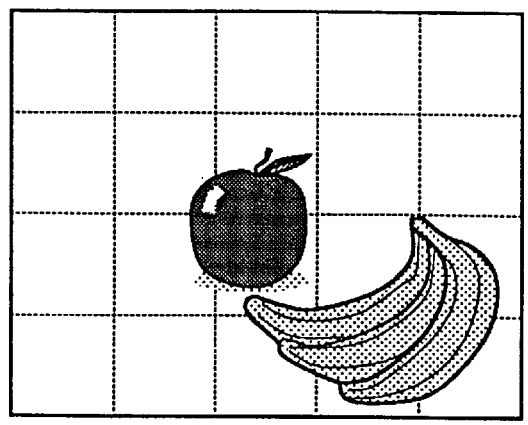
FIG. 6 is a diagram showing an example of an image which is divided into tiles and in which objects exist at the center and the lower right position of a screen.
Figure 7:
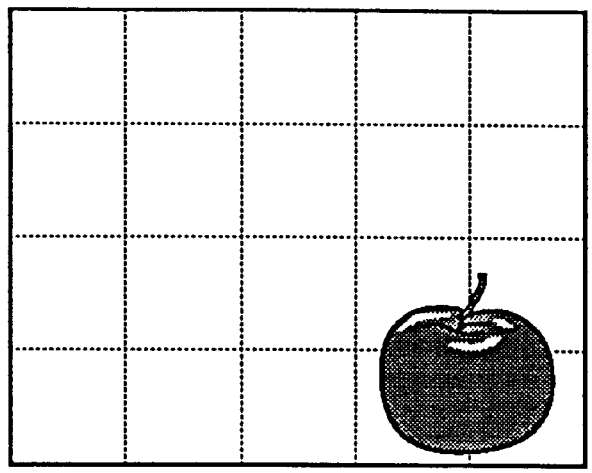
FIG. 7 is a diagram showing an example of an image which is divided into tiles and in which an object exists at the lower right position of the screen.
Figure 8:
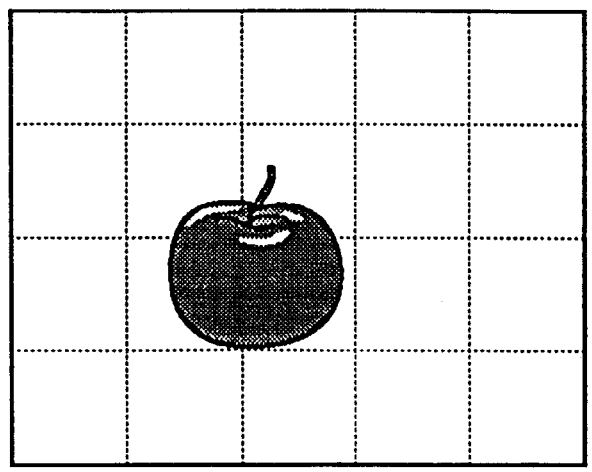
FIG. 8 is a diagram showing an example of an image which is divided into tiles and in which an object exists at the center of the screen.

FIGS. 6, 7, and 8 also show an example of an image which is divided into 20 tiles and stored in a manner similar to FIG. 2.

FIG. 9 shows a table in which the image IDs and image file storing paths are made correspond to each other in the invention. Reference numeral 91 denotes an image ID serving as an identification number which is individually allocated for each image file. Reference numeral 92 denotes a file path showing a storage destination in the external memory DISK 14 of the image file corresponding to the image ID. The file path corresponds to the directory and file of the MS-DOS.

FIG. 10 shows a table in which the image IDs, the key words of the tiles, and the image characteristics are made correspond to each other. Reference numeral 101 denotes an area to store the image IDs corresponding to the image IDs 91 in FIG. 9; 102 an area to store the tile number which each image ID has; and 103 an area in which the image characteristics drawn on the tile corresponding to the tile number 102 are expressed by a language and in which the key word is stored by a character code (for example, unicode). A plurality of key words can be also stored with respect to one tile number. Reference numeral 104 denotes an area to store the image characteristic of the tile corresponding to the tile number. In the invention, particularly, as for the image characteristics, color components in which an average of the pixel values of RGB constructing the tile is obtained and the number of colors is subtracted to 27 colors are used as representative colors of the tile. As a method of subtractive colors, a well-known method such as method of simply dividing each of the RGB pixel values, method using a reference table, or the like is used. In the diagram, the image whose image ID is equal to 1024 has 20 tiles, the key word of "sky" is allocated to the tile of the tile No. 0, and the color component of "11" is allocated as an image characteristic.

FIG. 11 is a table in which the key words, the image IDs, and the tile numbers are made correspond to each other. The table of FIG. 11 is a table in which the corresponding image IDs and tile numbers are collected every key word shown at 103 in FIG. 10. Reference numeral 111 denotes a key word; 112 an area to store the image ID corresponding to the key word of 111; and 113 an area to store the number of the tile having the key word 111 among the tiles corresponding to the image IDs.

FIG. 12 is a table in which the position designate words to designate the position of a search target object in an image and the tile numbers are made correspond to each other. Reference numeral 121 denotes an area to store the position designate word by a character code (for example, unicode). In the invention, as position designate words, ten words of "Top", "Upper Left", "Upper Right", "Middle", "Center", "Left Middle", "Right Middle", "Bottom", "Lower Left", and "Lower Right" are used. Reference numeral 122 denotes an area to store the tile number shown by the position designate word according to the divided tile. For example, when "Upper Right" is designated as a position designate word, the tile numbers of 3, 4, 8, and 9 shown in FIG. 2 are specified as search target positions.

FIG. 13 is a table in which the image characteristic words and the image characteristics are made correspond to each other. In the invention, the representative color of the tile is used as an image characteristic and a language showing the color is used as an image characteristic word. A color name (coloring) is stored in an area 131 as a characteristic word by a character code (for example, unicode). The image characteristic amount shown by the coloring is stored into an area 132 by the color component. In the diagram shown, for example, the coloring having the color components 2, 3, and 4 indicates "red".

FIG. 14 shows an example of a correspondence table of the image IDs and the key words which has conventionally been used. In order to store the image shown in FIG. 5 and the key word corresponding to the image, the image ID has been stored in an area 141 and the key word corresponding to the image ID has been stored in an area 142.

Figure 22:
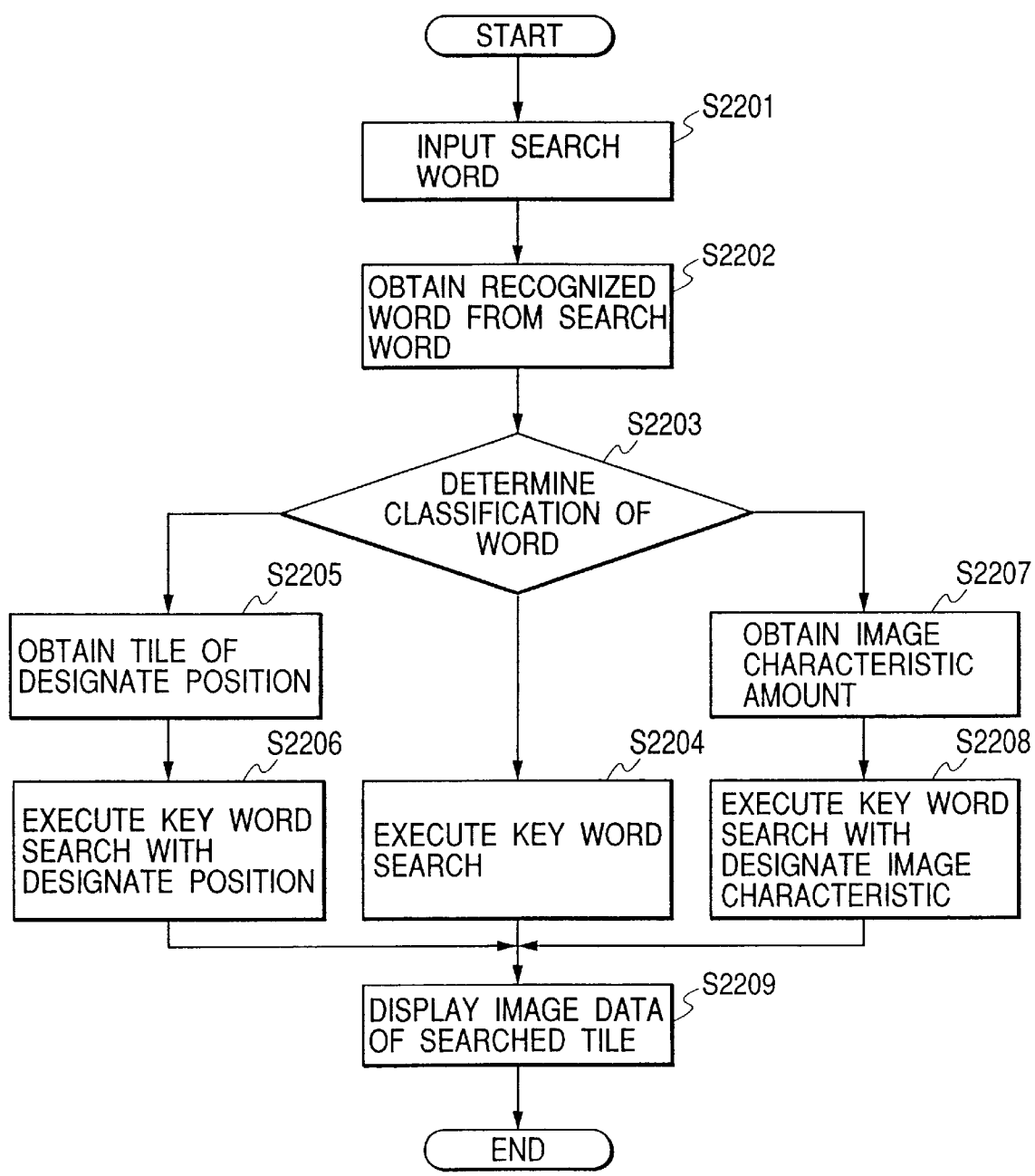
FIG. 22 is a flowchart for explaining the operation of an embodiment.

FIG. 22 is a flowchart for explaining the operation of the image searching apparatus of the invention and the operation will now be described hereinbelow with reference to FIG. 22.

In step S2201, a search word serving as a search target object is inputted. The inputting process of the search word is executed by storing a character code inputted from the keyboard KB 15 into the search word storing buffer WBUF in the RAM 13.

In step S2202, subsequently, the search word stored in the search word storing buffer WBUF is recognized as a word. The word is recognized by a well-known morpheme analyzing method by referring to the word dictionary DIC in the external memory DISK 14.

In step S2203, which one of the search target object, search designate position, and search target image characteristic the classification of word recognized in step S2202 indicates is discriminated.

The discrimination of the word classification can be performed by storing the classification of word in the word dictionary DIC of the external memory DISK 14. For example, if the search word is "red", the word classification is the search target image characteristic. If it is "left", the word classification is the search designate position. If the word classification is none of the search target image characteristic and the search designate position, it is the search target object. In accordance with the word classification determined in step S2203, the processing routine is branched to each process in step S2204, S2205, or S2207.

Step S2204 is a process in the case where it is determined that the search word is a search target object. The key word corresponding to the search word is searched. The search of the key word is performed with reference to the data table in FIG. 11 stored in the memory DISK 14. First, a check is made to see if the key word 111 which coincides with the search word exists. If it does not exist, the number of search tiles is regarded as 0 and step S2209 follows, thereby informing a fact that the tile including the search word does not exist.

When the key word which coincides with the search word is found, the corresponding image ID 112 and tile number 113 are extracted. When the search word coincides with a plurality of key words, the number of coincident key words, the image IDs, and tile numbers are stored into the output buffer OBUF. Step S2209 follows. In step S2209, the image data is displayed on the basis of the key word search result.

For example, when the user inputs a word of "yacht" as a search word, as a result in which the key word coincides, the tile numbers 13, 14, 18, and 19 of an image ID 1024 are obtained as a search result. Since the image has been divided and preserved, when displaying, the images of those four tiles can be first displayed. Thus, the image of FIG. 4 can be obtained.

In case of the image of FIG. 4, its area is ⅕ of that of the image of FIG. 2 and the time which is required to display is also reduced in accordance with it. When such an image exists on a network of a slow transmitting speed, the time which is required to transfer the image data can be also reduced as compared with that in case of transferring the whole image.

Step S2205 is a process in the case where it is determined that the search word includes the search designate position, and the designate position tile number is obtained. To obtain the designate position tile, the position designate word 121 which coincides with the search designate position word is checked with reference to the data table of FIG. 12 stored in the memory DISK 14. When they coincide, the corresponding tile numbers are extracted from the area 122 and stored into the search target tile number storing buffer TBUF which is temporarily stored in the RAM 13. When the coincident position designate word does not exist, an invalid value (for example, negative number) is stored into the search target tile number storing buffer TBUF.

Subsequently, in step S2206, the search target object designated by the search designate position is extracted from the input search word storing buffer WBUF. The key word which coincides with the search target object is searched by a method similar to the process in step S2204. When the coincident key word exists, the image IDs and the tile numbers are stored into the output buffer OBUF. A check is made to see if they coincide with those stored in the search target tile number storing buffer TBUF set in step S2205.

When the tile number coincides with the designate position, it is held as it is in the output buffer OBUF and the processing routine advances to step S2209. When the tile number does not coincide with the designate position, the tile number which does not coincide and the image ID are deleted from the output buffer OBUF and the number of key words is also reduced.

Any one of the processes in steps S2205 and S2206 can be executed first.

The tile number in which the key word coincides can be also derived from the tile numbers obtained in step S2205. With this method, there is no need to refer to the whole data table in FIG. 11. It is sufficient to merely refer to the table including the tile number obtained in step S2205. The search processing time can be reduced.

In step S2209, the image data is displayed on the basis of the key word search result.

The processes in steps S2205 and S2206 will now be described by using a specific example. They will be explained here by using an example of performing the process in step S2206 first. For example, when "apple at a lower right position" is given as a search word, as a result in which the search target object is "apple", the following three images are obtained: the image in which the image ID is equal to 1563 and the tile numbers are equal to 7 and 12; the image in which the image ID is equal to 1564 and the tile numbers are equal to 13, 14, 18, and 19; and the image in which the image ID is equal to 1565 and the tile numbers are equal to 6, 7, 11, and 12. Further, since "lower right" is designated as a designate position, only the image data of the image ID 1564 having the tile numbers 13, 14, 18, and 19 corresponding to the lower right is obtained as a search result and only the image shown in FIG. 7 is displayed.

Step S2207 is a process in the case where it is determined that the search word includes the search target image characteristic word ("red", "blue", etc.). The designated image characteristic amount is obtained. When the image characteristic amount is obtained, the coloring 131 which coincides with the image characteristic word is checked with reference to the data table of FIG. 13 stored in the memory DISK 14. When there is the coincident coloring 131, the corresponding image characteristic is extracted from the memory 132 and stored into the search target image characteristic storing buffer FBUF which is temporarily stored in the RAM 13. When the coincident coloring does not exist, the invalid value (for example, negative number) is stored in the search target image characteristic storing buffer FBUF.

In step S2208, the search target object designated by the search designation image characteristic is extracted from the input search word storing buffer WBUF. The key word which coincides with the search target object is searched by a method similar to the process in step S2204. When the coincident key word exists, the image ID and the tile number stored in the output buffer OBUF are extracted. The image characteristic 104 corresponding to the image ID and the tile number is extracted with reference to the data table of FIG. 10 stored in the memory DISK 14. A check is made to see if the extracted image characteristic coincides with the search target image characteristic storing buffer FBUF set in step S2207. When the image characteristic coincides with the designated image characteristic, they are held as they are in the output buffer OBUF. The processing routine advances to step S2209. When the image characteristic does not coincide with the designated image characteristic, the tile number and the image ID which do not coincide are deleted from the output buffer OBUF and the number of key words is also reduced.

In step S2209, the image data is displayed on the basis of the key word search result.

When the number of coincident key words is equal to 0 by referring to the output buffer OBUF outputted by the process in any one of steps S2204, S2205, and S2207, a fact that the search result does not exist is displayed on the CRT 18.

In the other cases, the tile number corresponding to the head image ID stored in the output buffer OBUF is displayed. The image ID and the tile number are designated and the image data of the corresponding tile is sent from the image file in the memory DISK 14 and is displayed on the CRT 18.

For example, when "red apple" is given as a search word, as a result of that the search target object is "apple", the following three images are obtained: the image in which the image ID is equal to 1563, the tile numbers are equal to 7 and 12, and the image characteristic is equal to 3; the image in which the image ID is equal to 1564, the tile numbers are equal to 13, 14, 18, and 19, and the image characteristic is equal to 15; and the image in which the image ID is equal to 1565, the tile numbers are equal to 6, 7, 11, and 12, and the image characteristic is equal to 15. Since "red" is designated as an image characteristic, only the image data of the image ID 1563 having the image characteristic 3 corresponding to "red" is derived as a search result and only the image shown in FIG. 6 is displayed.

Other Embodiment

Although the above embodiment has been described on the assumption that the number of tiles into which the image is divided is equal to 20, even if the number of tiles is set to an arbitrary number, processes can be also similarly executed. In this case, it is sufficient to proportionally allocate the number of tiles as the tile numbers in the correspondence table of the search position designate words and the tile numbers which are stored in the memory DISK 14.

Although the number of search position designate words has been set to 10, the invention is not limited to those words. It is also possible to use a plurality of position designate words such that the same designate position is shown and morphemes are different such as "upper" and "upward". Likewise, as for the image characteristic words, words showing similar colors such as "red", "red color", and "pure red" can be also handled as image characteristic words.

Although the representative colors of the tiles as image characteristic amounts have been used as color components, the image characteristic is not limited to the color components. Similar effects are also derived even if various image characteristic amounts such as luminance distribution of the image, a rough shape pattern due to the outline extraction, image frequency component, and the like may be handled.

It will be obviously understood that the invention is also accomplished by a method whereby program codes of software to realize the function of the foregoing embodiment are recorded into a storage medium, the storage medium is supplied to a system or an apparatus, and a computer (or CPU or MPU) of the system or apparatus reads out and executes the program codes stored in the storage medium.

In this case, the program codes themselves read out from the storage medium realize the new function of the invention. The storage medium in which the program codes have been stored constructs the invention.

As a storage medium to supply the program codes, for example, it is possible to use a floppy disk, a hard disk, an optical disk, a magnetooptic disk, CD-ROM, a CD-R, a magnetic tape, a non-volatile memory card, an ROM, or the like.

The function of the embodiment mentioned above is realized by executing the program codes read out by the computer. Further, the OS or the like which operates on the computer executes a part or all of the actual processes on the basis of the instruction of the program codes and the function of the embodiment mentioned above can be also realized by the processes executed.

Moreover, the program codes read out from the storage medium are written into a memory provided for a function expansion board inserted in a computer or a function expanding unit connected to a computer and, after that, on the basis of an instruction of the program codes, a CPU or the like equipped in the function expansion board or function expanding unit executes a part or all of the actual processes. The function of the foregoing embodiment can be also realized by the processes executed.

The invention can be also obviously applied to a case where the program codes of the software to realize the function of the embodiment mentioned above are recorded in the storage medium, and the program is transmitted from the storage medium to a requester through a communication infrastructure such as a personal computer communication or the like.

As described above, by dividing the image data into a plurality of areas and allocating the attribute information every area, the image data can be searched in consideration of the location in the image where the target search object exists.

By dividing the image data into a plurality of areas and allocating the attribute information every area, a portion including the target object can be extracted at a high speed from the image data in which the target image is included.

There is also an effect such that the time which is required to display is also reduced in association with it.

In the case where such an image exists on the network of a slow transmitting speed, the time which is required to transfer the image data can be also reduced as compared with the case of transferring the whole image.

Other Embodiment

A whole construction is omitted here because it is substantially the same as that mentioned above.

In the embodiment, an image search in which attention is paid to a point as a feature of the FlashPix format such that images of a plurality of resolutions are provided will now be described.

Figure 24:
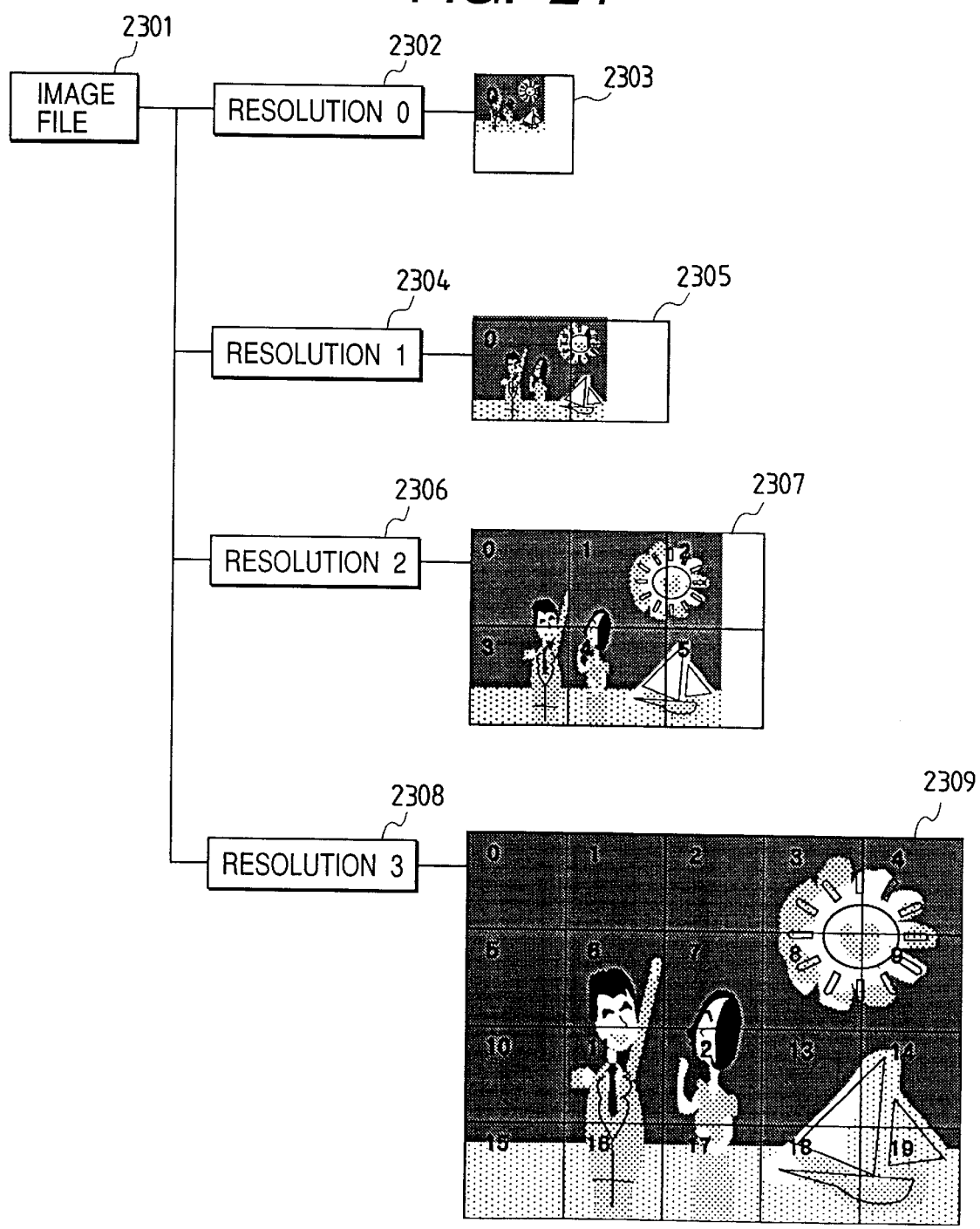
FIG. 24 is a diagram showing an example of layer images which are divided into tiles and are used in the invention.

If the image of FIG. 2 has layer images like a FlashPix format, it is as shown in FIG. 24. The image file of the FlashPix format has images of a plurality of resolutions. The image of the lowest resolution assumes a resolution 0 (layer No. 0) and the images are sequentially allocated to resolutions 1, 2, and 3. Resolution information as numerical value information showing the resolution will be referred to as image designation information (layer No.) hereinbelow. The image file is divided every layer of the resolution. The divided image data is divided into tiles of (64×64) pixels and a key word included in each tile is as described in FIG. 27. That is, in the layer No. 3 as image designation information, the following key words are allocated. "sky" is allocated to the tiles 0, 1, 2, 5, and 10. "sky" and "sun" are allocated to the tiles 3, 4, 8, and 9. "sky" and "male" are allocated to the tiles 6 and 11. "sky" and "female" are allocated to the tiles 7 and 12. "sky" and "yacht" are allocated to the tiles 13 and 14. "sea" is allocated to the tile 15. "sea" and "male" are allocated to the tile 16. "sea" and "female" are allocated to the tile 17. "sea" and "yacht" are allocated to the tiles 18 and 19. Similarly, in the layer No. 0, key words of "sky, sun, sea, male, female, yacht" are allocated to the tile 0.

FIG. 4 shows a partial image constructed by the tiles 13, 14, 18, and 19 of the image shown in FIG. 2.

FIGS. 6, 7, and 8 also show an example of the image divided into 20 tiles and stored in a manner similar to FIG. 2.

FIG. 9 shows a table in which the image IDs and the image file storing paths are made correspond to each other in the invention. Reference numeral 91 denotes the image ID which is the identification number which is individually allocated to each image file. Reference numeral 92 denotes the file path showing a storage destination in the external memory DISK 14 of the image file corresponding to the image ID. The file path 92 corresponds to the directory and file in the MS-DOS.

FIG. 29 shows a table in which the image IDs, the layer numbers as image designation information, the tile numbers as area designation information, the key words as attribute information, and the image characteristics are made correspond to each other. The area 101 stores the image ID corresponding to the area 91 in FIG. 9. The area 102 stores the tile number which each of the image IDs has. In the area 103, the image characteristic drawn on the tile corresponding to the tile number 102 is expressed by a language and a key word is stored by a character code (for example, unicode). A plurality of key words can be also stored with respect to one tile number. The area 104 stores the image characteristics of the tile corresponding to the tile number. As image characteristics, in the invention, color components in which the average of the pixel values of RGB constructing the tile is obtained and the number of colors is subtracted to 27 colors are used particularly as representative colors of the tile. As a method of subtractive colors, a well-known method such as method of simply dividing each of the RGB pixel values, method using a reference table, or the like is used. In the diagram, the image whose image ID is equal to 1024 has 20 tiles, the key word of "sky" is allocated to the tile of the tile No. 0, and the color component of "11" is allocated as an image characteristic. Reference numeral 1005 denotes a layer number. Although it is made correspond with respect to only the image data of the high resolution of the layer 3, it is obviously inserted into the correspondence table in FIG. 29 with regard to all of the layers (0, 1, 2, 3, . . . ).

FIG. 28 is a table in which the key words, the image IDs, the tile numbers, and the layer numbers are made correspond to each other. The table of FIG. 28 is a table in which the corresponding image IDs and tile numbers are collected every key word shown at 103 in FIG. 29. Reference numeral 1101 denotes a key word; 1102 an area to store the image ID corresponding to the key word of 1101; 1103 an area to store the number of the tile having the key word 1101 among the tiles corresponding to the image IDs; and 1104 an area to store the layer number corresponding to the image ID. Although only the layer 3 is stored here and any other layers are omitted, it is assumed that all of the layers (0, 1, 2, 3, . . . ) have been stored in the correspondence table.

FIG. 12 is a table in which the position designate words serving as one of the attribute information to designate the position of a search target object in an image and the tile numbers are made correspond to each other. The area 121 stores the position designate word by a character code (for example, unicode). In the embodiment, as position designate words, ten words of "Top", "Upper Left", "Upper Right", "Middle", "Center", "Left Middle", "Right Middle", "Bottom", "Lower Left", and "Lower Right" are used. The area 122 stores the tile number shown by the position designate word according to the divided tile. For example, when "Upper Right" is designated as a position designate word, the tile numbers of 3, 4, 8, and 9 are specified as search targets. As mentioned above, the position designate word (position designation information) indicates the position corresponding to the image of the tile.

FIG. 13 is a table in which the image characteristic words and the image characteristics are made correspond to each other. In the invention, the representative color of the tile is used as an image characteristic and a language showing the color is used as an image characteristic word. A color name (coloring) is stored in the area 131 as a characteristic word by a character code (for example, unicode). The image characteristic amount shown by the coloring is stored into the area 132 by the color component. In the diagram shown, for example, the coloring having the color components 2, 3, and 4 indicates "red".

In the embodiment, the representative color is divided into 27 colors as image characteristic amounts. In this instance, each of an R (Red) axis, a G (Green) axis, and a B (Blue) axis is divided into three equal parts and an RGB space is divided into 27 cells, thereby dividing the representative colors. When the representative color of the tile is determined, a candidate indicating to which one of the divided 27 equal cells the (64×64) pixels included in the tile correspond is voted. The cell in which the number of votes is the largest is set to the representative color. The divided 27 equal cells are shown by the numbers 0 to 26, respectively.

FIG. 14 shows an example of a correspondence table of the image IDs and the key words which has conventionally been used. In order to store the image shown in FIG. 5 and the key word corresponding to the image, the image ID has been stored in the area 141 and the key word corresponding to the image ID has been stored in the area 142.

Prior to performing the search processing of the image processing apparatus of the invention, a database is made, namely, the correspondence table as mentioned above is made. Although the database can be made any time, unless the correspondence table of the database is made, the search cannot be performed.

The user first selects image data to be inserted into the database. The image processing apparatus of the invention forms an image characteristic amount from the selected image data by the foregoing method.

The key word is subsequently extracted. Upon extraction and formation of the key word, for example, by analyzing a text of document data, the word dictionary DIC stored in the external memory (DISK) 14 is referred, the relevant word is extracted, and the key word is formed. Nouns which are generally used have been stored in the word dictionary DIC. In the image data, when the key word is formed, the user can also designate or a key word can be also allocated to an image in a certain region and stored. For example, when there is an image of "apple" in the image data, the "apple" is allocated as a key word to the tile in which the "apple" exists. "apple" is formed as a key word at a position corresponding to the image ID, tile number, and layer number in the correspondence table of the database.

As mentioned above, the key word and image characteristic amount as attribute information are extracted from the image data and formed.

Figure 23:
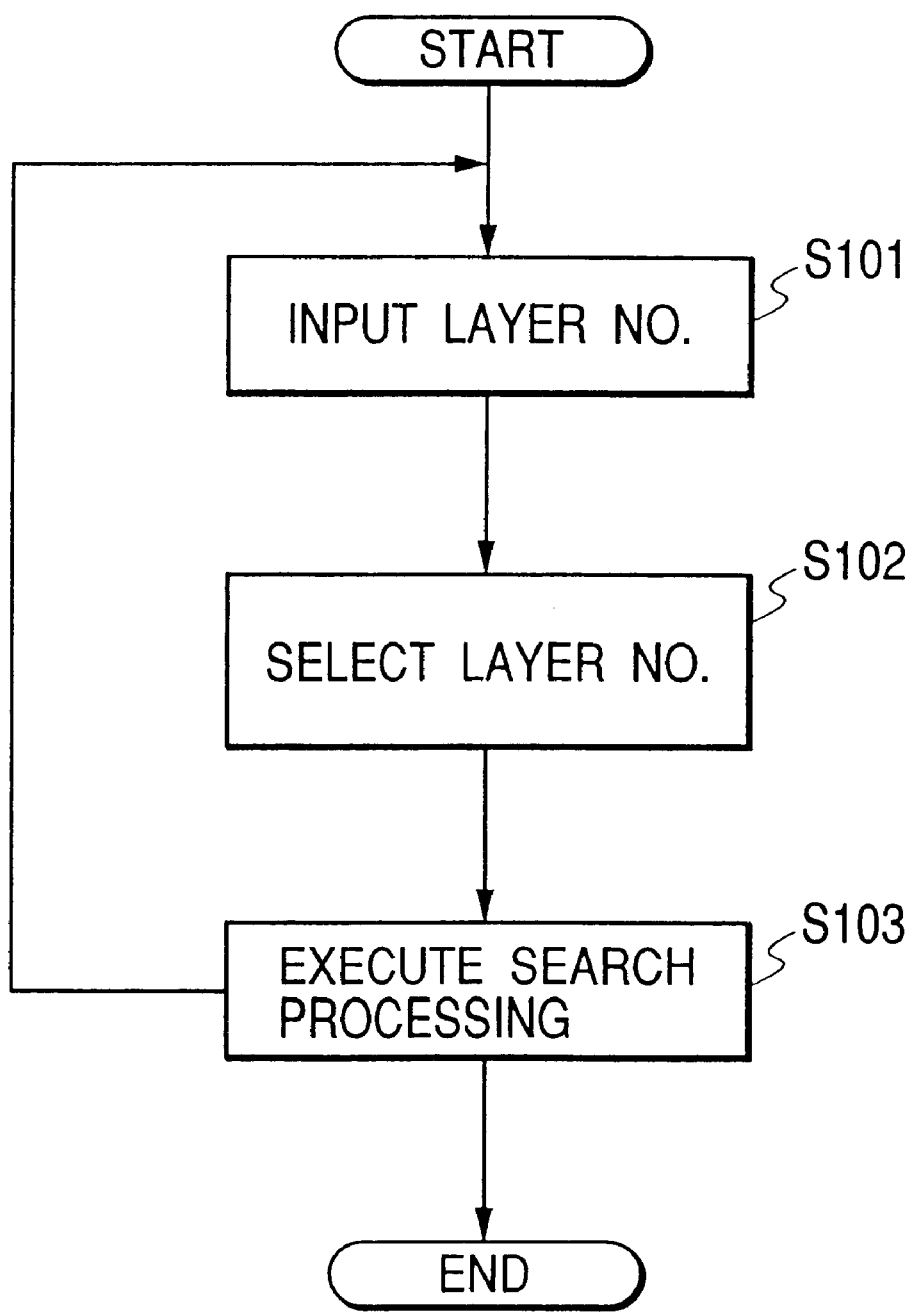
FIG. 23 is a flowchart for explaining the operation of another embodiment.

FIG. 23 is a flowchart for explaining the operation of the image processing apparatus of the invention and the operation will now be described hereinbelow with reference to FIG. 23. The process of the operation is realized by controlling by the CPU 11 on the basis of the search program stored in the ROM 12.

In step S101, the layer number as image designation information to be searched is inputted. The layer number is inputted from the keyboard KB 15.

In step S102, the layer number inputted in step S101 is stored in the RAM 13.

In step S103, the search processing is executed in the layer designated by the layer number selected in step S102. The search processing in step S103 will be described in detail hereinlater with reference to FIG. 24.

When the search processing is finished in step S103, either one of the mode to finish the processing routine and the mode to perform the search in a new layer can be selected. In case of newly searching, the processing routine is returned to step S101.

Figure 25:
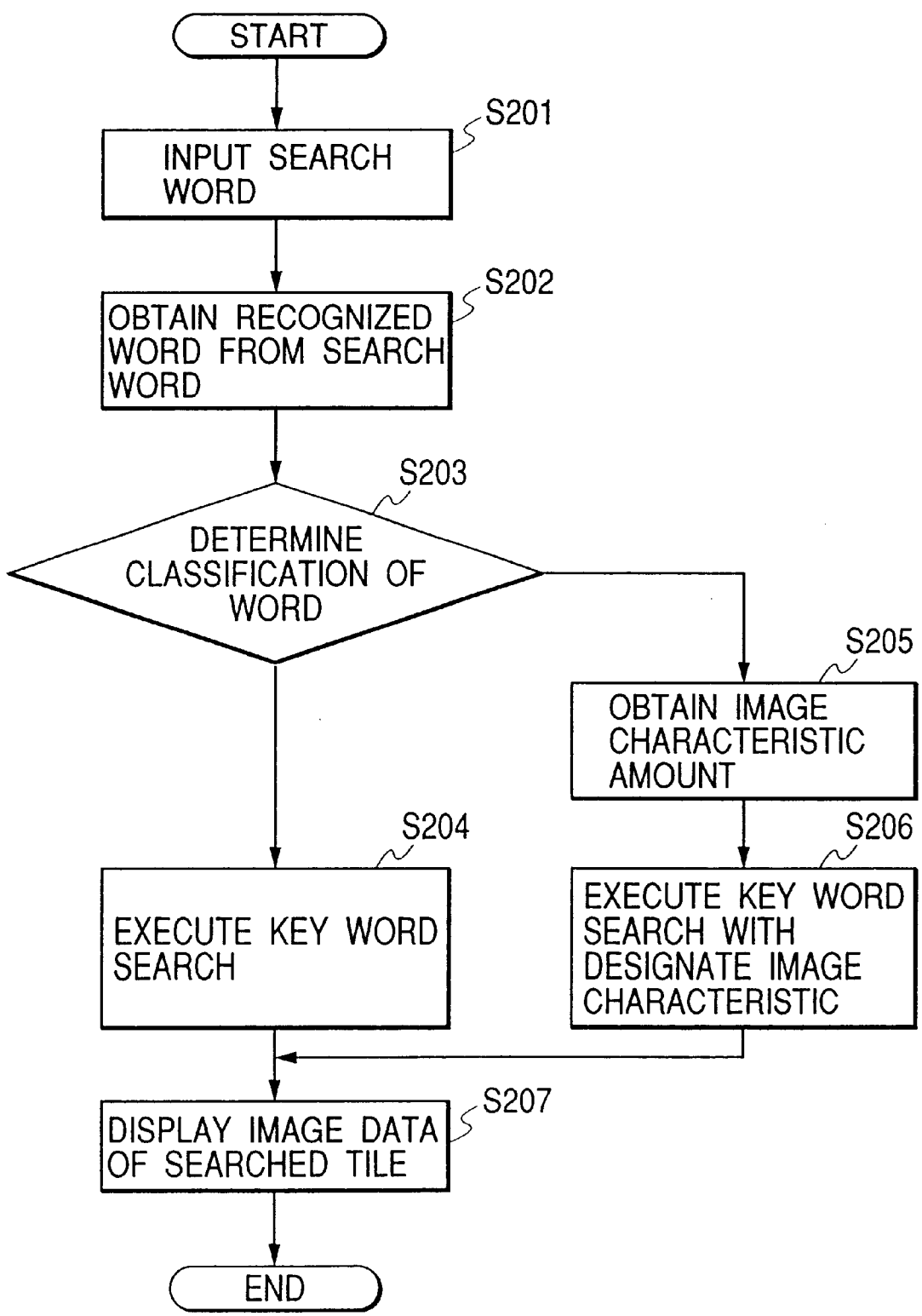
FIG. 25 is a flowchart for explaining the operation of the embodiment.

FIG. 25 is a flowchart for explaining the operation of the image processing apparatus of the invention and the search processing operation will now be described hereinbelow with reference to FIG. 25. The process of this operation is realized by controlling by the CPU 11 on the basis of a searching program stored in the ROM 12.

A search word as a target of the search is inputted in step S201. The input of the search word is performed by storing a character code inputted from the keyboard KB 15 into the search word storing buffer WBUF in the RAM 13.

The search word stored in the search word storing buffer WBUF is recognized as a word in step S202. The recognition of the word is performed by the well-known morpheme analyzing method by referring to the word dictionary DIC in the external memory DISK 14.

Which one of the search target object and the search target image characteristic the classification of word recognized in step S202 indicates is discriminated in step S203. The discrimination of the word classification can be performed by storing the classifications of words in the word dictionary DIC in the memory DISK 14. For example, if the search word is "red" or "blue", the word classification is the search target image characteristic. In the cases other than the color, the word classification is the search target object. The processing routine is branched to each process in step S204 or S205 in accordance with the word classification discriminated in step S203.

Step S204 is a process in the case where it is determined that the search word is the search target object. The key word corresponding to the search word is searched. The key word search is performed with reference to a data table of FIG. 28 stored in the memory DISK 14. First, a check is made to see if the key word 1101 which coincides with the search word exists in the search table (FIG. 28) corresponding to the layer selected in step S102 of the flowchart of FIG. 23. If the keyword 1101 exists, it is stored as a search result into the output buffer OBUF. If it does not exist, the number of search tiles is set to 0 and the processing routine advances to step S207.

Step S205 is a process when it is determined that the search word is the search target image characteristic word ("red", "blue", or the like). The designated image characteristic amount is obtained. When obtaining the image characteristic amount, the coloring 131 which coincides with the image characteristic word is checked with reference to the data table of FIG. 13 stored in the memory DISK 14. When the coloring 131 coincides, the corresponding image characteristic amount is extracted from the area 132 and stored into the search target image characteristic storing buffer FBUF which is temporarily stored in the RAM 13. When the coincident coloring does not exist, the invalid value (for example, negative number) is stored into the search target image characteristic storing buffer FBUF.

In step S206, the search target object which is designated by the search target image characteristic word is obtained by again classifying the word. For example, the word decorated by the search target image characteristic word "red" is searched, thereby obtaining the search target object of "apple". In only the layer in which the obtained search target object (for example "apple") is selected and designated by the layer number by a method similar to the process in step S204, the key word which coincides with the search target object is searched. As a search result, the image ID, layer number, and tile number are stored in the output buffer OBUF. When the key word is searched, the image ID, tile number, and layer number stored in the output buffer OBUF are extracted and the image characteristic 104 corresponding to the image ID, tile number, and layer number is extracted with reference to the data table of FIG. 29 stored in the memory DISK 14. A check is made to see if the extracted image characteristic coincides with the search target image characteristic storing buffer FBUF set in step S205. That is, in case of searching "red apple", "apple" is searched by the key word search. The image characteristics (0 to 26) are obtained from the searched image ID with reference to the data table of FIG. 29. A check is made to see if they coincide with the search target image characteristic ("red").

When the image characteristic obtained with reference to the data table coincides with the search target image characteristic, it is held as it is in the output buffer OBUF. The processing routine advances to step S207. When the image characteristic does not coincide with the designated image characteristic ("blue apple" or the like), the tile numbers, image IDs, and layer numbers which do not coincide are deleted from the output buffer OBUF. The number of key words is also reduced.

In step S207, on the basis of the key word search result and the image characteristic amount search result, the image data of the layer selected on the basis of the layer number as image designation information in the flowchart of FIG. 23 is displayed.

When the number of coincident key words is equal to 0 with reference to the output buffer OBUF outputted by the process in either one of steps S204 and S205, a fact that the search result does not exist is displayed on the CRT 18. When the number of key words is not equal to 0, the tile number and the layer number corresponding to the head image ID stored in the output buffer OBUF are displayed. The image ID, tile number, and layer number are designated. The image data corresponding to the tile number of the corresponding layer number is sent from the image file in the memory DISK 14 and displayed on the CRT 18.

For example, when the user designates the layer number as "3" and inputs the word of "yacht" as a search word, as a result in which the key word coincides, the tile numbers 13, 14, 18, and 19 of the layer No. 3 of the image ID 1024 are obtained as a search result. Since the image has been divided and preserved, when displaying, the images of those four tiles can be first displayed. Thus, the image of FIG. 4 is obtained.

In the image of FIG. 4, the area is ⅕ of that of the image of FIG. 2. The time which is required to display is also reduced in association with it. When such an image exists on a network of a slow transmitting speed, the time which is required to transfer the image data can be also reduced as compared with that in case of transferring the whole image.

For example, when "red apple" is given as a search word, as a result in which the search target object is "apple", the following three images are obtained: the image in which the image ID is equal to 1563, the tile numbers are equal to 7 and 12, and the image characteristic is equal to 3; the image in which the image ID is equal to 1564, the tile numbers are equal to 13, 14, 18, and 19, and the image characteristic is equal to 15; and the image in which the image ID is equal to 1565, the tile numbers are equal to 6, 7, 11, and 12, and the image characteristic is equal to 15. Further, since "red" is designated as an image characteristic, only the image data of the image ID 1563 having the image characteristic 3 corresponding to "red" is obtained as a search result. Only the image of FIG. 6 is displayed.

For example, when the user designates the layer number as "0" and inputs a word of "yacht" as a search word, as a result in which the key word coincides, the tile No. 1 of the layer No. 0 of the image ID 1024 is obtained as a search result. When displaying, an image of 2303 locating at the resolution 0 in the format diagram of FIG. 24 is displayed.

In the above description, although only the tiles of the relevant image in the search have been displayed, the invention is not limited to them but the whole image including the relevant tiles can be also displayed.

Figure 26:
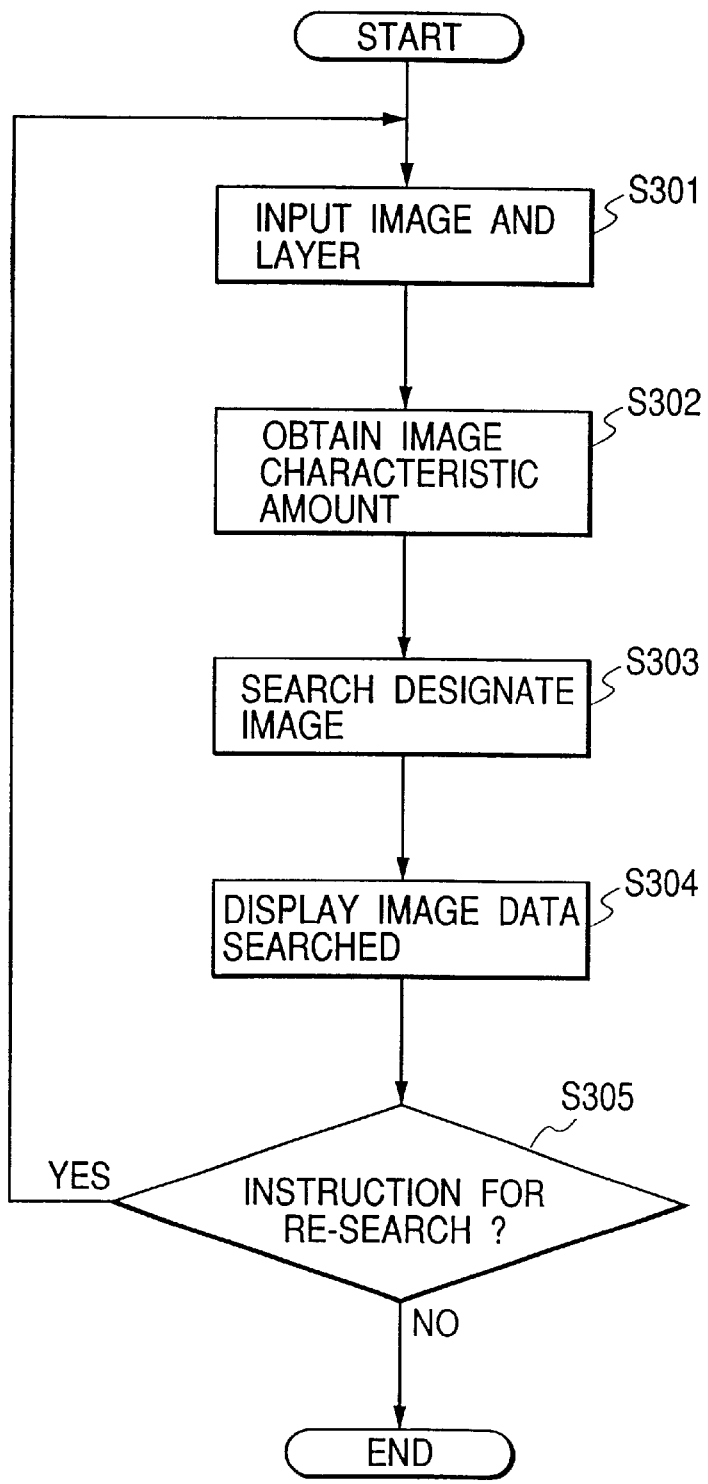
FIG. 26 is a flowchart for explaining the operation of the embodiment.

FIG. 26 is a flowchart showing the operation for an approximating search per layer of the image processing apparatus of the invention. The search processing operation will now be described hereinbelow with reference to FIG. 26. The process of this operation can be realized by controlling by the CPU 11 on the basis of the search program stored in the ROM 12.

First, in step S301, a designation of an image to be approximately searched and a layer (resolution) is inputted. For example, it is now assumed that the image of FIG. 7 and the layer number "0" (low resolution) were selected by the user.

In step S302, the image characteristic amount of the image inputted in step S301 is obtained with reference to the data table of FIG. 29. For example, "24" as an image characteristic amount corresponding to the layer number "0" of 1564 as an image ID in FIG. 7 is obtained.

In step S303, an image having an image characteristic amount near the image characteristic amount as a search target object obtained in step S302 is searched from the data table of FIG. 29. The searched image is stored into the output buffer OBUF. A searching range here is set to only the image corresponding to the layer inputted in step S301. For example, FIG. 8 as an image having an image characteristic amount near "24" as an image characteristic amount obtained in step S302 is derived from the image group of the layer number "0".

The extraction of the image having the near image characteristic is performed on the basis of a penalty matrix which is determined by the allocation of the image characteristic amounts. The penalty matrix has been stored in the memory DISK 14. As in the embodiment, the numbers 0 to 26 are allocated to the cells obtained by dividing the color space into 27 regions (cells obtained by dividing into three equal portions for the RGB axes), a difference (penalty) of the color of each number is decided by an allocating method, and it is stored into a table called a penalty matrix. For example, distances in the color spaces of the image characteristic amounts "1" and "10" have been stored in the penalty matrix (difference matrix). The distance in the color space becomes nearness of every image characteristic amount.

In step S304, the image data searched in step S303 is displayed. The image IDs and the layer numbers which were stored in the output buffer OBUF are displayed with reference to the output buffer OBUF which was searched and outputted by the process in step S303. The image ID and layer number are designated.

The image data corresponding to the corresponding layer number is sent from the image file in the memory DISK 14 and is sequentially displayed on the CRT 18 by the penalty matrix in accordance with the order from the near image characteristic amount. For example, FIGS. 8 and 6 are searched as images near FIG. 7. FIG. 8 is first displayed and FIG. 6 is subsequently displayed because of the order from the near image characteristic amount.

In step S305, a check is made to see if an instruction to perform the re-search has been inputted. If the instruction to perform the re-search is inputted, the processing routine is returned to step S301 and the re-search is executed. When an instruction indicating that the re-search is not performed is inputted, the search program is finished. In the re-search, steps S301 to S304 are repeated until the satisfactory search is executed. The process for re-searching is executed for only the image in which a target to be searched in step S303 has been searched in step S304. The search target is selected from the output buffer OBUF and only the portion in the new layer of the same image ID is used as a search target with reference to the data table in FIG. 29, so that the process can be easily performed.

By enabling the re-search in step S305 to be executed as mentioned above, there is an advantage such that a rough temporary (primary) search is performed at the low resolution and a detailed secondary search at a high resolution can be executed from the search result.

When the user is satisfied with the result of the temporary (primary) search, the user designates from the thumbnail display of the temporary search result by the keyboard KB 15, thereby obtaining the high resolution image data of the designated image through the memory DISK 14, RAM 13, or NIC 19 and displaying on the CRT 18.

In the image 2303 in FIG. 24, its area is equal to 1/64 of that of the image of FIG. 2 and the time which is required to display is also extremely reduced. The image 2303 is optimum as a list of the search result because of the thumbnail display as well. For the user, the temporary search is executed in the layer 0 of the low resolution and the thumbnail display as a list of the result is derived. Therefore, an image which he wants to see in detail later can be also designated. Further, when the user wants to search finer, the secondary search can be performed in the layer 3 of the high resolution from the search result of the temporary search. In case of the key word search, there is a merit such that the tile corresponding to the result is displayed. In case of searching the image characteristic amount, as shown in FIG. 3, since the image characteristic amount differs due to the average value depending on the layer, an effect such that the rough approximation search is performed in the layer 0 and the detailed search can be executed in the layer 2 or 3 is also derived.

Although the case such as "red apple" in step S202 of obtaining the search word in FIG. 25 has been described, other search words such as "top is sky, bottom is sea" or "top is white, bottom is blue" can be also inputted. By this method, a search to discriminate whether the key words "sky" and "sea" exist in the tile corresponding to the position designate word mentioned in FIG. 12 or not is performed. In case of the image characteristic amount, by discriminating whether the image characteristic amount "26" of white exists in the top tiles "0, 1, 2, 3, 4" or not and whether the image characteristic amount "9, 10" of blue exists in the bottom tiles "15, 16, 17, 18, 19" or not, the image characteristic amount can be easily obtained.

However, in case of an image such as a photograph or the like, there is a case where the portrait and landscape are replaced in dependence on a method of taking a picture. In other words, in case of a portrait photograph, since the top becomes the right (or left), so long as a search processing as mentioned above, a case where the search result is not obtained is considered. According to the invention, however, since it is possible to search every resolution, even in case of the search as mentioned above such that a missing will occur if the image is searched at a high resolution, a rough search of a low resolution can be performed. Therefore, a search missing ought to be extremely reduced.

Although the program to realize the operation of the image processing apparatus of the invention described in FIGS. 23, 25, and 26 has been stored in the ROM 12 as mentioned above, the invention can be embodied even if such a program is inputted from the external memory 14 as a storage medium such as floppy disk, CD-ROM, or the like.

Such a storage medium is also obviously incorporated in the scope of claims of the invention.

Although the invention has been described by using the image of the FlashPix format in the embodiment, naturally, the invention is not limited to it. Any other image formats can also realize the present invention so long as it is an image format having a plurality of images of different resolutions for a certain image or an image format in which certain image data is divided into a plurality of areas (tiles).

In the embodiment, although the search processing has been performed with regard to the image stored in the memory DISK 14, the invention can be also realized by searching images existing in an image server on the network through the NIC 19 and by downloading only the necessary images from the search result. In this case, in the process for displaying the search result on a tile unit basis, it is effective in terms of a point that the load of the network is reduced and the display can be performed at a high speed.

By realizing the image processing apparatus of the invention as in the embodiment, the image is layered to a plurality of images of different resolutions, and there is provided the means for allocating the layer numbers to the images of the respective layers, for making the attribute information showing the characteristics of the images correspond every image, for dividing the image of each layer into the continuous tiles, for allocating the tile numbers to the divided tiles, for making the key word showing the characteristic of the image correspond every tile, and for accumulating the correspondence relation between the tile numbers and the key words together with the image data. Therefore, from the image including a target object, a portion including the target object can be extracted at a high speed.

Since the search can be performed every resolution, the rough temporary search is performed in the image of a low resolution, the whole search result can be displayed like a thumbnail display, and further, the detailed secondary search can be executed at a high resolution. A situation such that the image to be actually searched is dropped out from the search processing is remarkably reduced. The desired image of the user can be searched and displayed at a high speed.

As mentioned above, since the storing means for storing the attribute information and the image designation information, respectively, for each image of the image file having a plurality of images is provided, a plurality of attribute information can be possessed for one kind of image.

What is claimed is:

1. An image processing apparatus comprising:
   a discriminating unit adapted to discriminate a position designate word from the other words in a search phrase input by a user by a classification of the search word phrase; and
   a searching unit adapted to search an area corresponding to the position designate word for image data which satisfies conditions of a key word in the case wherein it is determined by said discriminating unit that information indicative of the key word and said position designate word is included in said search word phrase.

2. An apparatus according to claim 1, wherein said image data is divided into a plurality of areas and stored.

3. An apparatus according to claim 2, wherein continuous numbers are allocated to said plurality of areas and said position information is managed by said numbers.

4. An apparatus according to claim 2, further comprising a storage unit adapted to allocate continuous numbers to said plurality of areas and storing said numbers and key words so as to correspond to each other.

5. An apparatus according to claim 2, wherein, in a case where it is determined by said discriminating unit that a key word coincides said search word, said searching unit searches an image data which satisfies conditions of the key word and position information only from image data having the key word.

6. An apparatus according to claim 1, further comprising a display unit adapted to display the image data searched by said searching unit.

7. An image processing apparatus, according to claim 1, further comprising an input unit adapted to input said search word.

8. An image processing method comprising:
   a discriminating step of discriminating a position designate word from the other words in a search word phrase input by a user by a classification of the search word phrase; and
   a searching step of searching an area corresponding to the position designate word for image data which satisfies conditions of a key word in the case wherein it is determined by said discriminating step that information indicative of the key word and said position designate word is included in said search word phrase.

9. A method according to claim 8, wherein said image data is divided into a plurality of areas and stored.

10. A method according to claim 9, wherein continuous numbers are allocated to said plurality of areas and said position information is managed by said numbers.

11. A method according to claim 9, wherein a key word is provided to each of said divided areas.

12. A method according to claim 9, further comprising a storing step of allocating continuous numbers to said plurality of areas and storing said numbers and key words so as to correspond to each other.

13. A method according to claim 9, wherein, in a case where it is determined by said discriminating step that a key word coincides said search word, said searching step searches an image data which satisfies conditions of the key word and position information only from image data having the key word.

14. A method according to claim 8, further comprising a displaying step of displaying the image data searched by said searching step.

15. An image processing method, according to claim 8, further comprising an inputting step of inputting said search word.

16. An image processing apparatus comprising:
   a first storage unit adapted to divide an image into a plurality of areas and storing attribute information comprising a key word for each of the areas;
   a searching unit adapted to search, when a search word phrase including a position designate word is designated by being input by a user, an attribute information corresponding to the search word phrase from a plurality of said attribute information stored in the first storage unit; and
   an output control unit adapted to control output of an area having searched attribute information searched by said searching unit.

17. An image processing apparatus according to claim 16, wherein said attribute information is a key word allocated to each area of an image.

18. An image processing apparatus according to claim 16, wherein said attribute information is an image characteristic amount allocated to each area of an image.

19. An image processing apparatus according to claim 18, wherein said image characteristic amount is a color component of an image data.

20. An image processing apparatus according to claim 18, wherein said image characteristic amount is a shape pattern of an image data.

21. An image processing apparatus according to claim 16, further comprising:
- a second storage unit adapted to allocate continuous numbers to said plurality of areas and storing said numbers and said image characteristic amounts so as to correspond to each other.

22. An image processing method comprising:
- a first storage step of dividing an image into a plurality of areas and storing attribute information comprising a key word for each of the areas;
- a searching step of when a search word phrase including a position designate word is designated by being input by a user, searching an attribute information corresponding to the search word phrase from a plurality of said attribute information stored in said first storage step; and
- an output control step of controlling output of an area having searched attribute information searched in said searching step.

23. An image processing method according to claim 22, wherein the attribute information is a key word allocated to each area of an image.

24. An image processing method according to claim 22, wherein the attribute information further comprises an image characteristic amount allocated to each area of an image.

25. An image processing method according to claim 22, wherein the image characteristic amount is a color component of an image data.

26. An image processing method according to claim 22, wherein the image characteristic amount is a shape pattern of an image data.

27. An image processing method according to claim 22, further comprising:
- a second storage step of allocating continuous numbers to the plurality of areas and storing the numbers and the image characteristic amounts so as to correspond to each other.

* * * * *

UNITED STATES PATENT AND TRADEMARK OFFICE
CERTIFICATE OF CORRECTION

PATENT NO. : 6,556,713 B2
DATED : April 29, 2003
INVENTOR(S) : Yuji Kobayashi et al.

It is certified that error appears in the above-identified patent and that said Letters Patent is hereby corrected as shown below:

Title page,
Item [*] Notice, insert the following:
-- This patent issued on a continued prosecution application filed under 37 CFR 1.53(d), and is subject to the twenty year patent term provisions of 35 U.S.C. 154 (a)(2). --.

Item [56], References Cited, U.S. PATENT DOCUMENTS, "5,757,224" should read -- 5,752,244 --.

Column 2,
Lines 34, 38, 41, 44 and 47 "correspond" should read -- to correspond --.

Column 3,
Lines 15, 18, 56, 59, 62, 64 and 67, "correspond" should read -- to correspond --.

Column 4,
Line 59, "are" should read -- is --.

Column 7,
Line 30 "correspond" should read -- to correspond --.

Column 13,
Lines 23 and 38 "correspond" should read -- to correspond --.

Column 19,
Lines 23 and 27, "correspond" should read -- correspond to --.

Column 20,
Lines 3 and 35, "coincides" should read -- coincides with --.

Signed and Sealed this

Sixth Day of January, 2004

JAMES E. ROGAN
*Director of the United States Patent and Trademark Office*